US00RE46174E

(19) United States
(12) Reissued Patent
Petrovykh

(10) Patent Number: US RE46,174 E
(45) Date of Reissued Patent: Oct. 4, 2016

(54) METHOD AND APPARATUS FOR INTELLIGENT ROUTING OF INSTANT MESSAGING PRESENCE PROTOCOL (IMPP) EVENTS AMONG A GROUP OF CUSTOMER SERVICE REPRESENTATIVES

(71) Applicant: Genesys Telecommunications Laboratories, Inc., Daly City, CA (US)

(72) Inventor: Yevgeniy Petrovykh, Walnut Creek, CA (US)

(73) Assignee: GENESYS TELECOMMUNICATIONS LABORATORIES, INC., Daly City, CA (US)

(21) Appl. No.: 14/569,587

(22) Filed: Dec. 12, 2014

Related U.S. Patent Documents

Reissue of:

(64) Patent No.: 7,730,135
Issued: Jun. 1, 2010
Appl. No.: 11/927,353
Filed: Oct. 29, 2007

U.S. Applications:

(63) Continuation of application No. 09/932,033, filed on Aug. 17, 2001, now Pat. No. 7,299,259.

(51) Int. Cl.
*G06F 15/16* (2006.01)
*H04M 3/00* (2006.01)
(Continued)

(52) U.S. Cl.
CPC ..... *H04L 12/581* (2013.01); *G06Q 10/063* (2013.01); *G06Q 10/107* (2013.01);
(Continued)

(58) Field of Classification Search
None
See application file for complete search history.

(56) References Cited

U.S. PATENT DOCUMENTS 4,718,005 A 1/1988 Feigenbaum et al.
4,800,583 A 1/1989 Theis
(Continued)

FOREIGN PATENT DOCUMENTS

EP 1120951 A2 8/2001
EP 1225752 A2 7/2002
(Continued)

OTHER PUBLICATIONS

Atkins, David et al., Mawl: Integrated Web and Telephone Service Creation, Bell Laboratories, Lucent Proprietary, Mar. 4, 1997, 21 pages.
(Continued)

*Primary Examiner* — Minh Dieu Nguyen
(74) *Attorney, Agent, or Firm* — Lewis Roca Rothgerber Christie LLP

(57) ABSTRACT

A routing system is provided for intelligent routing of instant messages between clients connected to a data network and customer service representatives connected to the network. The system comprises at least one instant message server and at least one intermediate server connected to and addressable on the network, the intermediate server capable of routing and accessible to the instant message server. Clients connecting to the instant message server through instant message software assert a connection link advertised by the instant message server to establish bi-directional communication between the client machine and the intermediate server. In preferred application, the intermediate server interacts with the client for identification of client and client software. The client request is then routed to an appropriate customer service representative running compatible software according to enterprise rules establishing an active instant message connection between the client and the selected customer service representative.

10 Claims, 11 Drawing Sheets

(51) Int. Cl.

| | |
|---|---|
| ***H04L 12/58*** | (2006.01) |
| ***H04L 12/24*** | (2006.01) |
| ***H04M 3/51*** | (2006.01) |
| ***H04M 7/00*** | (2006.01) |
| ***G06Q 10/06*** | (2012.01) |
| ***H04L 29/08*** | (2006.01) |
| ***G06Q 10/10*** | (2012.01) |
| *H04L 29/06* | (2006.01) |
| *H04M 3/22* | (2006.01) |
| *H04M 3/36* | (2006.01) |
| *H04M 3/42* | (2006.01) |
| *H04M 3/523* | (2006.01) |
| *H04M 7/12* | (2006.01) |

(52) U.S. Cl.

CPC ..... *H04L 41/18* (2013.01); *H04L 51/04* (2013.01); *H04L 63/0281* (2013.01); *H04L 65/4007* (2013.01); *H04L 67/02* (2013.01); *H04L 67/04* (2013.01); *H04L 67/142* (2013.01); *H04L 67/24* (2013.01); *H04M 3/5141* (2013.01); *H04M 3/5183* (2013.01); *H04M 3/5191* (2013.01); *H04M 7/003* (2013.01); *H04L 29/06027* (2013.01); *H04L 65/1016* (2013.01); *H04L 67/327* (2013.01); *H04M 3/2218* (2013.01); *H04M 3/36* (2013.01); *H04M 3/42093* (2013.01); *H04M 3/42365* (2013.01); *H04M 3/5231* (2013.01); *H04M 3/5238* (2013.01); *H04M 7/12* (2013.01); *H04M 2203/2011* (2013.01); *H04M 2203/4536* (2013.01); *H04Q 2213/1305* (2013.01); *H04Q 2213/13072* (2013.01); *H04Q 2213/13103* (2013.01); *H04Q 2213/13164* (2013.01); *H04Q 2213/13335* (2013.01); *H04Q 2213/13349* (2013.01)

(56) References Cited

U.S. PATENT DOCUMENTS

| | | | |
|---|---|---|---|
| 4,958,368 | A | 9/1990 | Parker |
| 5,006,983 | A | 4/1991 | Wayne et al. |
| 5,036,535 | A | 7/1991 | Gechter et al. |
| 5,040,208 | A | 8/1991 | Jolissaint |
| 5,062,103 | A | 10/1991 | Davidson et al. |
| 5,155,761 | A | 10/1992 | Hammond |
| 5,163,083 | A | 11/1992 | Dowden et al. |
| 5,181,236 | A | 1/1993 | LaVallee et al. |
| 5,206,903 | A | 4/1993 | Kohler et al. |
| 5,271,058 | A | 12/1993 | Andrews et al. |
| 5,274,700 | A | 12/1993 | Gechter et al. |
| 5,311,574 | A | 5/1994 | Livanos |
| 5,311,583 | A | 5/1994 | Friedes et al. |
| 5,436,967 | A | 7/1995 | Hanson |
| 5,452,350 | A | 9/1995 | Reynolds et al. |
| 5,535,335 | A | 7/1996 | Cox et al. |
| 5,542,088 | A | 7/1996 | Jennings, Jr. et al. |
| 5,557,736 | A | 9/1996 | Hirosawa et al. |
| 5,583,922 | A | 12/1996 | Davis et al. |
| 5,586,174 | A | 12/1996 | Bogner et al. |
| 5,611,050 | A | 3/1997 | Theimer et al. |
| 5,633,924 | A | 5/1997 | Kaish et al. |
| 5,678,002 | A | 10/1997 | Fawcett et al. |
| 5,689,548 | A | 11/1997 | Maupin et al. |
| 5,696,486 | A | 12/1997 | Poliquin et al. |
| 5,742,905 | A | 4/1998 | Pepe et al. |
| 5,757,904 | A | 5/1998 | Anderson |
| 5,764,913 | A | 6/1998 | Jancke et al. |
| 5,777,614 | A | 7/1998 | Ando et al. |
| 5,778,060 | A | 7/1998 | Otto |
| 5,825,869 | A | 10/1998 | Brooks et al. |
| 5,848,143 | A | 12/1998 | Andrews et al. |
| 5,867,562 | A | 2/1999 | Scherer |
| 5,870,464 | A | 2/1999 | Brewster et al. |
| 5,884,032 | A | 3/1999 | Bateman et al. |
| 5,892,764 | A | 4/1999 | Riemann et al. |
| 5,895,459 | A | 4/1999 | Enomoto |
| 5,898,770 | A | 4/1999 | Valentine |
| 5,907,547 | A | 5/1999 | Foladare et al. |
| 5,911,134 | A | 6/1999 | Castonguay et al. |
| 5,913,040 | A | 6/1999 | Rakavy et al. |
| 5,918,222 | A | 6/1999 | Fukui et al. |
| 5,926,539 | A | 7/1999 | Shtivelman |
| 5,943,478 | A | 8/1999 | Aggarwal et al. |
| 5,956,509 | A | 9/1999 | Kevner |
| 5,960,442 | A | 9/1999 | Pickering |
| 5,964,837 | A | 10/1999 | Chao et al. |
| 5,966,653 | A | 10/1999 | Joensuu et al. |
| 5,966,699 | A | 10/1999 | Zandi |
| 5,999,965 | A | 12/1999 | Kelly |
| 6,011,845 | A | 1/2000 | Nabkel et al. |
| 6,064,730 | A | 5/2000 | Ginsberg |
| 6,064,874 | A | 5/2000 | Cox et al. |
| 6,085,097 | A | 7/2000 | Savery et al. |
| 6,108,700 | A | 8/2000 | Maccabee et al. |
| 6,111,940 | A | 8/2000 | Kugell |
| 6,112,243 | A | 8/2000 | Downs et al. |
| 6,115,743 | A | 9/2000 | Cowan et al. |
| 6,137,869 | A | 10/2000 | Voit et al. |
| 6,157,655 | A | 12/2000 | Shtivelman |
| 6,161,099 | A | 12/2000 | Harrington et al. |
| 6,163,607 | A | 12/2000 | Bogart et al. |
| 6,178,443 | B1 | 1/2001 | Lin |
| 6,199,099 | B1 | 3/2001 | Gershman et al. |
| 6,229,888 | B1 | 5/2001 | Miloslavsky |
| 6,230,197 | B1 | 5/2001 | Beck et al. |
| 6,259,774 | B1 | 7/2001 | Miloslavsky |
| 6,278,936 | B1 | 8/2001 | Jones |
| 6,301,609 | B1 | 10/2001 | Aravamudan et al. |
| 6,308,216 | B1 | 10/2001 | Goldszmidt et al. |
| 6,317,786 | B1 | 11/2001 | Yamane et al. |
| 6,324,683 | B1 | 11/2001 | Fuh et al. |
| 6,327,364 | B1 | 12/2001 | Shaffer et al. |
| 6,332,154 | B2 | 12/2001 | Beck et al. |
| 6,345,305 | B1 | 2/2002 | Beck et al. |
| 6,363,421 | B2 | 3/2002 | Barker et al. |
| 6,367,013 | B1 | 4/2002 | Bisbee et al. |
| 6,373,836 | B1 | 4/2002 | Deryugin et al. |
| 6,389,007 | B1 | 5/2002 | Shenkman et al. |
| 6,389,028 | B1 | 5/2002 | Bondarenko et al. |
| 6,389,127 | B1 | 5/2002 | Vardi et al. |
| 6,389,132 | B1 * | 5/2002 | Price ..... 379/265.01 |
| 6,392,666 | B1 | 5/2002 | Hong et al. |
| 6,405,035 | B1 | 6/2002 | Singh |
| 6,408,062 | B1 | 6/2002 | Cave |
| 6,415,318 | B1 * | 7/2002 | Aggarwal ..... G06Q 10/107 370/230 |
| 6,424,709 | B1 | 7/2002 | Doyle et al. |
| 6,430,602 | B1 | 8/2002 | Kay et al. |
| 6,434,121 | B1 | 8/2002 | Davidson et al. |
| 6,434,230 | B1 | 8/2002 | Gabriel |
| 6,442,432 | B2 | 8/2002 | Lee |
| 6,449,646 | B1 | 9/2002 | Sikora et al. |
| 6,449,648 | B1 | 9/2002 | Waldo et al. |
| 6,477,374 | B1 | 11/2002 | Shaffer et al. |
| 6,484,196 | B1 | 11/2002 | Maurille |
| 6,487,590 | B1 | 11/2002 | Foley et al. |
| 6,493,446 | B1 | 12/2002 | Cherry |
| 6,493,447 | B1 | 12/2002 | Goss et al. |
| 6,546,419 | B1 | 4/2003 | Humpleman et al. |
| 6,553,336 | B1 | 4/2003 | Johnson et al. |
| 6,564,261 | B1 | 5/2003 | Gudjonsson et al. |
| 6,571,282 | B1 | 5/2003 | Bowman-Amuah |
| 6,574,605 | B1 | 6/2003 | Sanders et al. |
| 6,578,054 | B1 | 6/2003 | Hopmann et al. |
| 6,584,186 | B1 | 6/2003 | Aravamudan et al. |
| 6,584,499 | B1 | 6/2003 | Jantz et al. |
| 6,587,831 | B1 | 7/2003 | O'Brien |
| 6,603,396 | B2 | 8/2003 | Lewis et al. |
| 6,603,837 | B1 | 8/2003 | Kesanupalli et al. |
| 6,606,668 | B1 | 8/2003 | MeLampy et al. |

(56) References Cited

U.S. PATENT DOCUMENTS

| | | | | |
|---|---|---|---|---|
| 6,611,498 | B1 | 8/2003 | Baker et al. | |
| 6,611,590 | B1 | 8/2003 | Lu et al. | |
| 6,618,369 | B1 | 9/2003 | Huh et al. | |
| 6,631,407 | B1 | 10/2003 | Mukaiyama et al. | |
| 6,650,748 | B1 | 11/2003 | Edwards et al. | |
| 6,651,085 | B1 | 11/2003 | Woods | |
| 6,654,816 | B1 | 11/2003 | Zaudtke et al. | |
| 6,658,106 | B1 | 12/2003 | Atkinson et al. | |
| 6,661,889 | B1 | 12/2003 | Flockhart et al. | |
| 6,665,375 | B1 | 12/2003 | Forlenza et al. | |
| 6,697,858 | B1 | 2/2004 | Ezerzer et al. | |
| 6,701,366 | B1 | 3/2004 | Kallas et al. | |
| 6,707,906 | B1 * | 3/2004 | Ben-Chanoch | 379/266.07 |
| 6,724,884 | B2 | 4/2004 | Jensen et al. | |
| 6,728,262 | B1 | 4/2004 | Woram | |
| 6,728,365 | B1 | 4/2004 | Li et al. | |
| 6,747,970 | B1 | 6/2004 | Lamb et al. | |
| 6,748,471 | B1 | 6/2004 | Keeney et al. | |
| 6,760,767 | B1 | 7/2004 | Miesbauer et al. | |
| 6,763,384 | B1 | 7/2004 | Gupta et al. | |
| 6,775,371 | B2 | 8/2004 | Elsey et al. | |
| 6,782,413 | B1 | 8/2004 | Loveland | |
| 6,795,830 | B1 | 9/2004 | Banerjee et al. | |
| 6,810,026 | B1 | 10/2004 | Huttunen | |
| 6,822,945 | B2 | 11/2004 | Petrovykh | |
| 6,842,877 | B2 | 1/2005 | Robarts et al. | |
| 6,857,012 | B2 | 2/2005 | Sim et al. | |
| 6,868,525 | B1 | 3/2005 | Szabo | |
| 6,874,090 | B2 | 3/2005 | See et al. | |
| 6,985,576 | B1 * | 1/2006 | Huck | 379/265.09 |
| 6,996,603 | B1 | 2/2006 | Srinivasan | |
| 7,187,662 | B1 | 3/2007 | Klingman | |
| 7,224,774 | B1 * | 5/2007 | Brown | H04L 12/581 379/88.14 |
| 7,269,160 | B1 * | 9/2007 | Friedman | G06Q 30/0601 370/352 |
| 7,299,259 | B2 * | 11/2007 | Petrovykh | 709/205 |
| 7,324,637 | B2 | 1/2008 | Brown et al. | |
| 7,586,859 | B2 | 9/2009 | Petrovykh | |
| 7,730,135 | B2 | 6/2010 | Petrovykh | |
| 7,929,464 | B2 | 4/2011 | Petrovykh | |
| 7,929,562 | B2 | 4/2011 | Petrovykh | |
| 7,953,219 | B2 | 5/2011 | Freedman et al. | |
| 9,031,087 | B2 | 5/2015 | Petrovykh | |
| 2001/0000458 | A1 | 4/2001 | Shtivelman et al. | |
| 2001/0025310 | A1 | 9/2001 | Krishnamurthy et al. | |
| 2001/0031997 | A1 | 10/2001 | Lee | |
| 2001/0042123 | A1 | 11/2001 | Moody et al. | |
| 2001/0044840 | A1 | 11/2001 | Carleton | |
| 2001/0054064 | A1 * | 12/2001 | Kannan | 709/203 |
| 2002/0018554 | A1 | 2/2002 | Jensen et al. | |
| 2002/0049608 | A1 | 4/2002 | Hartsell et al. | |
| 2002/0055853 | A1 | 5/2002 | Macleod et al. | |
| 2002/0055967 | A1 | 5/2002 | Coussement | |
| 2002/0055975 | A1 | 5/2002 | Petrovykh | |
| 2002/0056000 | A1 | 5/2002 | Albert Coussement | |
| 2002/0116531 | A1 * | 8/2002 | Chu | 709/246 |
| 2002/0143987 | A1 | 10/2002 | Sadler et al. | |
| 2002/0154171 | A1 | 10/2002 | Lee et al. | |
| 2002/0178227 | A1 * | 11/2002 | Matsa et al. | 709/206 |
| 2003/0009530 | A1 | 1/2003 | Philonenko et al. | |
| 2003/0046396 | A1 | 3/2003 | Richter et al. | |
| 2003/0212583 | A1 | 11/2003 | Perras, Jr. et al. | |
| 2005/0033846 | A1 | 2/2005 | Sankaranarayan et al. | |
| 2005/0289068 | A1 | 12/2005 | Stefik et al. | |
| 2007/0294410 | A1 | 12/2007 | Pandya et al. | |
| 2008/0071917 | A1 | 3/2008 | Petrovykh | |
| 2011/0286444 | A1 | 11/2011 | Petrovykh | |
| 2013/0145019 | A1 | 6/2013 | Petrovykh | |
| 2016/0134754 | A1 | 5/2016 | Petrovykh | |

FOREIGN PATENT DOCUMENTS

| | | | |
|---|---|---|---|
| EP | 1227635 | A2 | 7/2002 |
| EP | 1109387 | A3 | 12/2003 |
| EP | 1119170 | A3 | 12/2003 |
| EP | 1107615 | B1 | 6/2004 |
| EP | 1423795 | A4 | 10/2004 |
| EP | 1206106 | A3 | 6/2005 |
| EP | 1478167 | A3 | 10/2005 |
| EP | 1535173 | A4 | 10/2005 |
| EP | 1540900 | A4 | 10/2005 |
| GB | 2338870 | A | 12/1999 |
| KR | 2001-0016151 | A | 3/2001 |
| WO | 9914930 | A2 | 3/1999 |
| WO | 0022802 | A2 | 4/2000 |
| WO | 0044159 | A1 | 7/2000 |
| WO | 0069140 | A1 | 11/2000 |
| WO | 0140959 | A1 | 6/2001 |
| WO | 0223877 | A2 | 3/2002 |
| WO | 03025776 | A1 | 3/2003 |
| WO | 2004021127 | A2 | 3/2004 |
| WO | 2004023324 | A1 | 3/2004 |

OTHER PUBLICATIONS

Boyer, David G. et al., Presence Awareness Tools for Virtual Enterprises, Bell Labs, Lucent Technologies, Holmdel, New Jersey, U.S., 6 pages.

Brause, Rudiger, Prozess-Scheduling with Google English Translation, URL:http://home.fhtw-berlin.de/{s0505342/scheduling.pdf>, Dec. 16, 2002, XP002342968, 13 pages.

Brazier, Frances et al., Formal Specification of Multi-Agent Systems: a Real World Case, 1995, 8 pages.

Brown, Scott M. et al., Intelligent Interface Agents for Intelligent Environments, U.S., 1998, 3 pages.

Day, M. et al., Request for Comments (RFC) 2778: A Model for Presence and Instant Messaging, Internet Engineering Task Force—IETF RFC 2778, Feb. 2000, 12 pages.

Day, M. et al., RFC 2779—Instant Messaging/ Presence Protocol Requirements, Internet Society, Feb. 2000, 21 pages.

Decision on Appeal for European Patent Application No. 02761182.1, dated Aug. 6, 2011, 21 pages.

European Office action for Patent Application No. 02001005.4, dated Mar. 10, 2005, 7 pages.

European Office action for Patent Application No. 01125447.1, dated May 8, 2006, 4 pages.

European Office action for Patent Application No. 02000168.1, dated Jun. 3, 2004, 6 pages.

European Office action for Patent Application No. 02000168.1, Jul. 19, 2005, 5 pages.

European Office action for Patent Application No. 02761182.1, dated Jun. 25, 2008, 8 pages.

European Office action for Patent Application No. 02761182.1, dated Jun. 29, 2005, 6 pages.

European Office action for Patent Application No. 03791883.6, dated Jul. 11, 2008, 3 pages.

European Office action for Patent Application No. 03791883.6, dated Oct. 18, 2006, 5 pages.

European Office action for Patent Application No. 04009486.4, dated Jun. 10, 2014, 3 pages.

European Office action for Patent Application No. 04009486.4, dated Mar. 10, 2008, 6 pages.

European Office action for Patent Application No. 04009486.4, dated May 25, 2011, 5 pages.

European Search Report for Patent Application No. 01125447, issued on Apr. 15, 2005, 2 pages.

European Search Report for Patent Application No. 02000168, issued on Feb. 19, 2004, 2 pages.

European Search Report for Patent Application No. 02001005, issued on Aug. 25, 2004, 1 page.

European Search Report for Patent Application No. 02761182.1, issued on Aug. 2, 2004, 1 page.

European Search Report for Patent Application No. 03749323.6, issued on Aug. 29, 2005, 1 page.

European Search Report for Patent Application No. 03791883, issued on Aug. 29, 2005, 1 page.

European Search Report for Patent Application No. 04009486.4, dated Sep. 12, 2005, 4 pages.

(56) References Cited

OTHER PUBLICATIONS

FIE 2000: 30th Annual Frontiers in Education Conference: Building on a century of progress in engineering education: Conference proceedings: Hyatt Regency Crown Center Hotel, Kansas City, Missouri, U.S., Oct. 18-21, 2000, IEEE Tab Products, Piscataway, NJ, IEEE Catalog No. 00CH37135, ISBN:07803-6424-4, 3 pages.
Guttman, Robert H. et al., Agent-mediated Integrative Negotiation for Retail Electronic Commerce, MIT Media Laboratory, Cambridge, Massachusetts, U.S., 1998, 13 pages.
International Search Report for PCT/US2002/23851, mailed on Sep. 17, 2002, p. 1.
International Search Report for PCT/US2003/26935, mailed on Jun. 7, 2004, p. 1.
International Search Report for PCT/US2003/27418, mailed on Jan. 28, 2004, 2 pages.
Koplowitz, H.B., Instant Mess (Lost in Cyberspace), Online, 1999, Retrieved from the Internet at http://hbkoplowitz.com/LIC/instant/im.html, Jul. 22, 2004, 2 pages.
Lowekamp, Bruce et al., A resource Query Interface for Network—Aware Applications, School of Computer Science, Carnegie Mellon University, Pittsburgh, Pennsylvania, U.S., 1999, 8 pages.
Michael, Bill, Hey Buddy . . . , Commweb, Online, May 11, 2000, XP002270636, Retrieved from the Internet, Nov. 5, 2000, 4 pages.
Moon Y.S. et al., A CRM model based on Voice over IP, IEEE, 2000, 5 pages.
Nardi, Bonnie A. et al., Interaction and Outeraction: Instant Messaging in Action, AT&T Labs—Research, Information and Computer Science, University of California, Irvine, Irvine, CA, U.S., 2000, 10 pages.
Panagos, Euthimios et al., Reducing Escalation—Related Costs in WFMSs, AT&T Labs—Research, 1997, 21 pages.
Rosenberg, J. et al., Draft-Roseberg-sip-pip-00.txt: SIP for Presence, Nov. 18, 1998, 22 pages.
Silver, A. et al., Unified Network Presence Management, Nortel Network Wireline Solutions, May 21, 2000, XP002195089 Retrieved from the Internet Mar. 28, 2002, 6 pages.
Tanir, Oryal et al., Call Center Simulation in Bell Canada, Proceedings of the 1999 Winter Simulation Conference, Canada, 8 pages.
U.S. Appl. No. 09/710,042, filed Nov. 8, 2000, 34 pages.
Voida, Amy et al., Interviewing Over Instant Messaging, College of Computing, GVU Center, Georgia Tech, Atlanta, Georgia; IBM T.J. Watson Research Center, Yorktown Heights, New York, U.S., 4 pages.
Wellman, Michael P., A computational market model for distributed configuration design, Artificial Intelligence for Engineering, Design, Analysis and Manufacturing, vol. 9, Issue 2, 1995, doi:10.1017/S089006040000216X, 1 page.
Wurman, Peter R. et al., A Control Architecture for Flexible Internet Auction Servers, Artificial Intelligence Laboratory, University of Michigan, Michigan, U.S., Feb. 6, 1999, 12 pages.
Wurman, Peter R. et al., A Parametrization of the Auction Design Space, Games and Economic Behavior 35, 304-338, 2001, May 19, 1998, 35 pages, DOI:10.1006/game.2000.0828, available online at http://www/idealibrary.com.
Zwicky, Elizabeth D. et al., Building Internet Firewalls, O'Reilly, US , Sebastopol, Jun. 2000, XP002290595, 3 pages.
Day, M., et al., A Model for Presence and Instant Messaging, XP-002201444 Network Working Group, Feb. 2000, 17 pages.

* cited by examiner

Customer Interface

Subscribing Agent Interface

METHOD AND APPARATUS FOR INTELLIGENT ROUTING OF INSTANT MESSAGING PRESENCE PROTOCOL (IMPP) EVENTS AMONG A GROUP OF CUSTOMER SERVICE REPRESENTATIVES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED DOCUMENTS

The present [invention] *application* is a *reissue patent application of U.S. Pat. No. 7,730,135 filed on Oct. 29, 2007 as patent application Ser. No. 11/927,353, which is a* continuation of U.S. patent application Ser. No. 09/932,033, filed on Aug. 17, 2001, now U.S. Pat. No. 7,299,259[, which is a continuation-in-part (CIP) to a]. *This reissue patent application is also related to* U.S. patent application Ser. No. 09/766,271, filed Jan. 18, 2001 and now abandoned, [entitled "Personal Interaction Interface for Communication-Center Customers ", which is a CIP to a] *and to* U.S. patent application Ser. No. 09/710,042 [entitled "System for improved reporting of communication center presence in formation to prospective clients"], filed on Nov. 08, 2000 and now abandoned, disclosure of which is incorporated herein in its entirety by reference.

FIELD OF THE INVENTION

The present invention is in the field of telecommunication encompassing all existing sorts of interaction multimedia technology, and pertains more particularly to methods and apparatus for intelligently routing Instant Messaging Presence Protocol (IMPP) events to individual customer service representatives (CSRs) among a group of CSRs working in a communication center or other business premise.

BACKGROUND OF THE INVENTION

In the field of telephony communication, there have been many improvements in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regard to client satisfaction. Such computer-enhanced telephony is known in the art as computer-telephony integration (CTI).

Generally speaking, CTI implementations of various design and purpose are implemented both within individual call-centers and, in some cases, at the telephone network level. For example, processors running CTI software applications may be linked to telephone switches, service control points (SCP), and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI processors and other hardware within a call-center is commonly referred to as customer premises equipment (CPE). It is the CTI processor and application software is such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display units (PC/VDU) so that agents manning such stations may have access to stored data as well as being linked to incoming callers by telephone equipment. Such stations may be interconnected through the PC VDU by a local area network (LAN). One or more data or transaction servers may also be connected to the LAN that interconnects agent stations. The LAN is, in turn, typically connected to the CTI processor, which is connected to the call switching apparatus of the call center.

When a call arrives at a call center, whether or not the call has been pre-processed at an SCP, typically at least the telephone number of the calling line is made available to the receiving switch at the call center by the network provider. This service is available by most networks as caller-ID information in one of several formats such as Automatic Number Identification (ANI). Typically the number called is also available through a service such as Dialed Number Identification Service (DNIS). If the call center is computer-enhanced (CTI), the phone number of the calling party may be used as a key to access additional information from a customer information system (CIS) database at a server on the network that connects the agent workstations. In this manner information pertinent to a call may be provided to an agent, often as a screen pop on the agent's PC/VDU.

In recent years, advances in computer technology, telephony equipment, and infrastructure have provided many opportunities for improving telephone service in publicly switched and private telephone intelligent networks. Similarly, development of a separate information and data network known as the Internet, together with advances in computer hardware and software have led to a new multimedia telephone system known in the art by several names In this new systemology, telephone calls are simulated by multimedia computer equipment, and data, such as audio data, is transmitted over data networks as data packets. In this system the broad term used to describe such computer-simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony. The conventional systems are referred to herein as Connection-Oriented Switched-Telephony (COST) systems, CTI enhanced or not.

COST telephony is not limited to wired, or land-line systems, but may include wireless network systems as well. The purpose of the definitions here is to distinguish clearly between data-packet systems, which share available bandwidth, and non-packet systems, which use dedicated connections or channels.

The computer-simulated, or DNT systems are familiar to those who use and understand computers and data-network systems. Perhaps the best example of DNT is telephone service provided over the Internet, which will be referred to herein as Internet Protocol Network Telephony (IPNT), by far the most extensive, but still a subset of DNT. DNT systems may also include wireless sub-systems.

Both systems use signals transmitted over network links. In fact, connection to data networks for DNT such as IPNT is typically accomplished over local telephone lines, used to reach points in the network such as an Internet Service Provider (ISP). The definitive difference is that COST telephony may be considered to be connection-oriented telephony. In the COST system, calls are placed and connected by a specific dedicated path, and the connection path is maintained over the time of the call. Bandwidth is basically assured. Other calls and data do not share a connected channel path in a COST system. A DNT system, on the other hand, is not dedicated or connection-oriented. That is, data, including audio data, is prepared, sent, and received as data packets over a data-network. The data packets share network links, and may travel by varied and variable paths.

In addition to Internet protocol (IPNT) calls, a DNT center may also share other forms of media with customers accessing the system through their computers. E-mails, video mails, fax, file share, file transfer, video calls, and so forth are some of the other forms of media, which may be used. This capability of handling varied media leads to the term multimedia communications center. A multimedia communications center may be a combination CTI and DNT center, or may be a DNT center capable of receiving COST calls and converting them to a digital DNT format. The term communication center will replace the term call center hereinafter in this specification when referring to multimedia capabilities.

In systems known to the inventors, incoming IPNT calls are processed and routed within an IPNT-capable communication center in much the same way as COST calls are routed in a CTI-enhanced call-center, using similar or identical routing rules, waiting queues, and so on, aside from the fact that there are two separate networks involved. Communication centers having both CTI and IPNT capability utilize LAN-connected agent-stations with each station having a telephony-switch-connected headset or phone, and a PC connected, in most cases via LAN, to the network carrying the IPNT calls. Therefore, in most cases, IPNT calls are routed to the agent's PC while conventional telephony calls are routed to the agent's conventional telephone or headset. Typically separate lines and equipment must be implemented for each type of call weather COST or IPNT.

Due in part to added costs associated with additional equipment, lines, and data ports that are needed to add IPNT capability to a CTI-enhanced call-center, companies are currently experimenting with various forms of integration between the older COST system and the newer IPNT system. For example, by enhancing data servers, interactive voice response units (IVR), agent-connecting networks, and so on, with the capability of conforming to Internet protocol, call data arriving from either network may be integrated requiring less equipment and lines to facilitate processing, storage, and transfer of data.

With many new communication products supporting various media types available to businesses and customers, a communication center must add significant application software to accommodate the diversity. For example, e-mail programs have differing parameters than do IP applications. IP applications are different regarding protocol than COST calls, and so on. Separate routing systems and/or software components are needed for routing e-mails, IP calls, COST calls, file sharing, etc. Agents must then be trained in the use of a variety of applications supporting the different types of media.

Keeping contact histories, reporting statistics, creating routing rules and the like becomes more complex as newer types of media are added to communication center capability. Additional hardware implementations such as servers, processors, etc. are generally required to aid full multimedia communication and reporting. Therefore, it is desirable that interactions of all multimedia sorts be analyzed, recorded, and routed according to enterprise (business) rules in a manner that provides seamless integration between media types and application types, thereby allowing agents to respond intelligently and efficiently to customer queries and problems.

More recently, communications companies have been developing ways to add a new IPNT medium to multimedia options for communication. This newer medium is the well-known instant message (IM) service. Instant messaging enables online or network connected parties to generate and deliver text messages to one another over the network. The inventors have incorporated IM technology within a communication center environment in order to provide more efficient solutions to challenges such as the ability to communicate current communication center status to customers attempting to reach the center for service for example.

Older call-centers relying on COST communication techniques simply play recorded messages, the recordings informing the customers of the status of an agent being called. More advanced communication centers, including multimedia centers, have more extensive automated services in place for interacting with customers in the event that no agents are available. Most of these services are, however, IVR driven and inform callers of options, as well as status of those persons the callers are attempting to connect with.

Challenges that have been addressed using IM technology include communicating estimated call-waiting times. In prior art, this is accomplished using IVR interaction. A customer must invest the time and suffer the inconvenience of placing a call to the communication center in order to receive the status information. As described above, this information is made available through IVR interaction in prior art systems.

One network-based system known to the inventor enables users of the system to obtain current agent-status information related to agents of an information-source facility connected to the network before initiating contact with the agent or agents of the information-source facility. The system comprises a status-server node connected to the information-source facility (communication center) and to the network, an interface-server node connected to the status node and to the network, the status-server node accessible to the interface node, a user-operated network-capable appliance connected to the network, the interface node accessible to the network-capable appliance, and a software application distributed on at least the status and interface server nodes, the software application enabling distribution of the agent-status information to the user-operated appliance.

The user operating the network-capable appliance connects to the network and accesses the interfacing server node and requests the agent-status information, the agent-status information is then accessed from the status server node connected to the communication center by the interfacing server node and delivered to the requesting user over the operating network.

The system, in one aspect, uses instant message presence protocol (IMPP) technology compatible with a formal protocol such as IMMP-IETF RFC 2778 and is described in disclosure included herein and referenced by Ser. No. 09/710,042 in the cross-reference section above. Such a system saves phone costs for customers and/or agents as well as reduces utilization requirements of communication-center interface technologies such as IVR technology.

An enhancement to this system enables communication center agents using the system also to obtain current status information related to clients of an information-source facility connected to the network in order to optimize callback connection success from the agents to the monitored clients.

Also known to the inventor and referenced in the cross-reference section as Ser. No. 09/766,271 is a similar system that further provides a self-service interface for clients of a communication or information center that enables the client to determine agent states without calling the center, publish his or her own state without requiring the center to initiate a call, and perform a variety of business-related tasks at the center without requiring any agent interaction.

The system utilizes an IMPP capable application for enabling a client to interact with communication-center resources through an interactive client interface component operable by the client for posting client data and for receiving and displaying agent and interaction data from the communication center.

A brokering component is also provided for managing client and communication center data and communication, and, additionally, a status monitoring and reporting component is provided for monitoring and reporting communication center and client status. The application is characterized in that a client using the user interface is enabled to access and alter communication center data, and also to initiate live interaction with the communication center. The application is described in relation to Internet uses and system architecture as well.

In the area of IPNT outside of secure environments, Instant Messaging Presence Protocol IMPP has become a rapidly growing and popular form of communication. Active communication using standard IM messaging is enabled when connected IMPP users have downloaded and installed software from an IMPP service provider. Once the users are connected online, text typed in a senders dialog box is instantly viewable by a recipient.

There are many service providers offering IMPP service on the Internet today. Two of the most popular providers are MSN™ Messenger Service and AOL™ Instant Messenger. Despite the extreme popularity and growth of IMPP systems, a security standard has not yet been established for the instant communication method. Therefore, companies that want to use IM for private communication, whether internally between agents or between agents and clients, must either design a completely new IMPP system from the ground up or trust AOL or MSN enough to send all traffic (including sensitive information) through their networks.

As a result, the contributions referenced above as prior art, if third-party hosted, must be significantly tooled to provide adequate security and presence protocol as it applies to communication center guidelines or, if proprietary, completely created from scratch as a communication-center-controlled service requiring client (customer) subscription and full software provision.

A secondary challenge in implementing a secure IMPP service in a communication center environment is that most third-party provided systems are not compatible with each other requiring a third-party host, such as a communication center to incorporate all of the software and hardware requirements to host multiple services used by clients. In this environment it becomes difficult for agents to respond in an ordered and coherent fashion especially if bombarded with multiple IMs from differing services.

Therefore, what is clearly needed is a system that allows controlled and intelligent routing of IMs to individual CSRs (agents) working as a group of active agents wherein intelligent rules and constraints are applied for ordering and in some cases structuring the communication sequences.

SUMMARY OF THE INVENTION

In a preferred embodiment of the present invention, a routing system operable on a data-packet-network is provided for intelligent routing of instant messages between clients connected to the network and customer service representatives connected to the network. The system comprises at least one instant message server connected to and addressable on the network and at least one intermediate server connected to and addressable on the network and accessible to the instant message server the intermediate server having access to routing rules and capability. Clients connected to the network and operating instant message software connect to the instant message server for the purpose of establishing communication with available customer service representatives, and wherein assertion of a connection link advertised by the instant message server establishes bi-directional communication between the client machine and the intermediate server, the intermediate server interacting with including identifying the client and version of instant message software used by the client for the purpose of routing the client request to an appropriate customer service representative thereby establishing an active instant message connection between the client and the selected customer service representative.

In a preferred embodiment the system is operationally coupled the Internet network. Also, in a preferred embodiment, the client connection comprises a network appliance capable of instant messaging operationally coupled to the network. In the same embodiment, customer service representative connection comprises a network appliance capable of instant messaging operationally coupled to the network.

In one aspect, the network appliance operated by the client is a computer. In one aspect the network appliance operated by the customer service representative is a computer. In one aspect, the customer service representatives are human resources. In another embodiment, the customer service representatives include automated systems. In a preferred aspect of the routing system, the addressing system used to identify appliances to be connected by the system is Internet protocol addressing.

In one aspect, the at least one instant message server retains responsibility of hosting ongoing communication between clients and customer service representatives after connection. In another aspect, the at least one intermediate server is granted the responsibility of hosting ongoing communication between clients and customer service representatives. In all aspects, the client, customer service representative, and intermediate server involved in a single routed and established communication channel run instant messaging software compatible to that hosted by the instant message server used to initiate the connection.

In one embodiment, the customer service representatives are agents operating within a communication center and connected to a local area network. In another embodiment, the customer service representatives are remote agents operating from addressable locations on the network not confined to one location. In one aspect, the at least one intermediate server requests and receives routing instructions from a separate server containing an intelligent routing software suite used for disposing all communication events occurring within the center. In a preferred aspect, the routing capability includes routing based on customer service representative availability. In a variation of this aspect, the routing capability includes routing based on skill level of a customer service representative.

In another aspect of the present invention, a proxy server is provided for routing instant messages sourced from clients connected to a data-packet-network to selected ones of a plurality of customer service representatives connected to the network and representing an enterprise of, at least one bi-directional data port for receiving data thereto and sending data there from, at least one version of instant messaging software executable therein for generating, sending, and receiving instant messages, a software routing component executable therein for routing client instant message requests to selected IP addresses on the network; and a software firewall component operable therein and capable of IP address translation.

The server receives incoming instant message events for routing, identifies and interacts with individual clients using instant message protocol and routes qualified requests to available customer service representatives based on enterprise routing rules for instant messaging. In a preferred embodiment, the proxy server is operationally coupled to the Internet network. In all aspects, the client connection comprises a network appliance capable of instant messaging operationally coupled to the network. Also in all aspects, the customer service representative connection comprises a network appliance capable of instant messaging operationally coupled to the network. In one aspect, the network appliance operated by the client is a computer. In one aspect, the network appliance operated by the customer service representative is a computer. In one aspect, the customer service representatives are human resources. In another aspect, the customer service representatives include automated systems.

In one aspect, after establishing a routed connection, the same server continues to host the communication transaction. Also in one aspect, routing destination is determined as a result executed routing routines according to routing rules. In one aspect, the routing rules and executed routing routines are generic to a transaction server running a software suite for determination of internal routing for all multimedia and COST events occurring within the center. In one aspect, the routing capability includes routing based on customer service representative availability. According to an enhancement of this aspect, the routing capability includes routing based on skill level of a customer service representative.

In still another aspect of the present invention, a method is provided for establishing an instant message communication channel over a data-packet-network between a client and a customer service representative representing an enterprise based on returned results of at least one executed routing routine. The method comprises the steps of, (a) client establishment of a network connection, (b) establishing a client-to-server connection with an instant message server using an instant messaging software application, (c) establishing a connection from the instant message server to an intermediary proxy server through client link assertion, (d) the proxy server interacting with the client using instant messaging software to obtain information for routing, (e) the proxy server requesting execution of at least one intelligent routing routine on behalf of the client request and information obtained through client interaction, (f) the proxy server requesting execution of at least one intelligent routing routine on behalf of the client request and information obtained through client interaction, and (g) routing the client request from the proxy server to an appropriate customer service representative based on results of routine execution.

In a preferred embodiment, the method is practiced over the Internet network. In one aspect of the method in step (a), client connection comprises a network appliance having instant messaging capability operationally coupled to the network. In one embodiment, the network appliance is a computer. In one aspect of the method in step (c), the instant message server optionally re-directs the client to the proxy server and relinquishes communication hosting. In one aspect of the method in step (d), the interaction results in at least client identification, version identification of instant message software used by the client, and a reason for requesting communication with a customer service representative.

In one aspect of the method in step (e), the at least one routing routine comprises an availability determination of existence of a network-connected customer service representative having a compatible instant messaging software to that used by the client. According to an enhancement of this aspect of the method in step (e) the at least one routing routine further comprises a skill level determination. In one aspect of the method in step (e), the execution request is handled by a separate server running a routing software suite for routing communication events within the enterprise.

In one aspect of the method in step (f) the proxy server hosts the ongoing routed and established communication transaction. In still another aspect in step (f), the instant message server continues to host the ongoing routed and established transaction. Optionally in both of these aspects of the method, the transaction is conducted through a firewall.

Now, for the first time, a system is provided that allows controlled and intelligent routing of instant messages to individual customer service representatives working as a group of active agents including automated systems wherein intelligent routing rules and constraints are applied for ordering and in some cases structuring the routed and established communication sequences.

BRIEF DESCRIPTION OF THE DRAWING FIGURES

DESCRIPTION OF THE PREFERRED EMBODIMENTS

In accordance with a preferred embodiment of the present invention, the inventor provides a novel software-hardware driven system for improving the reporting of communication-center presence information to prospective communication-center clients. The method and apparatus of the present invention is described in enabling detail below.

Figure 1:
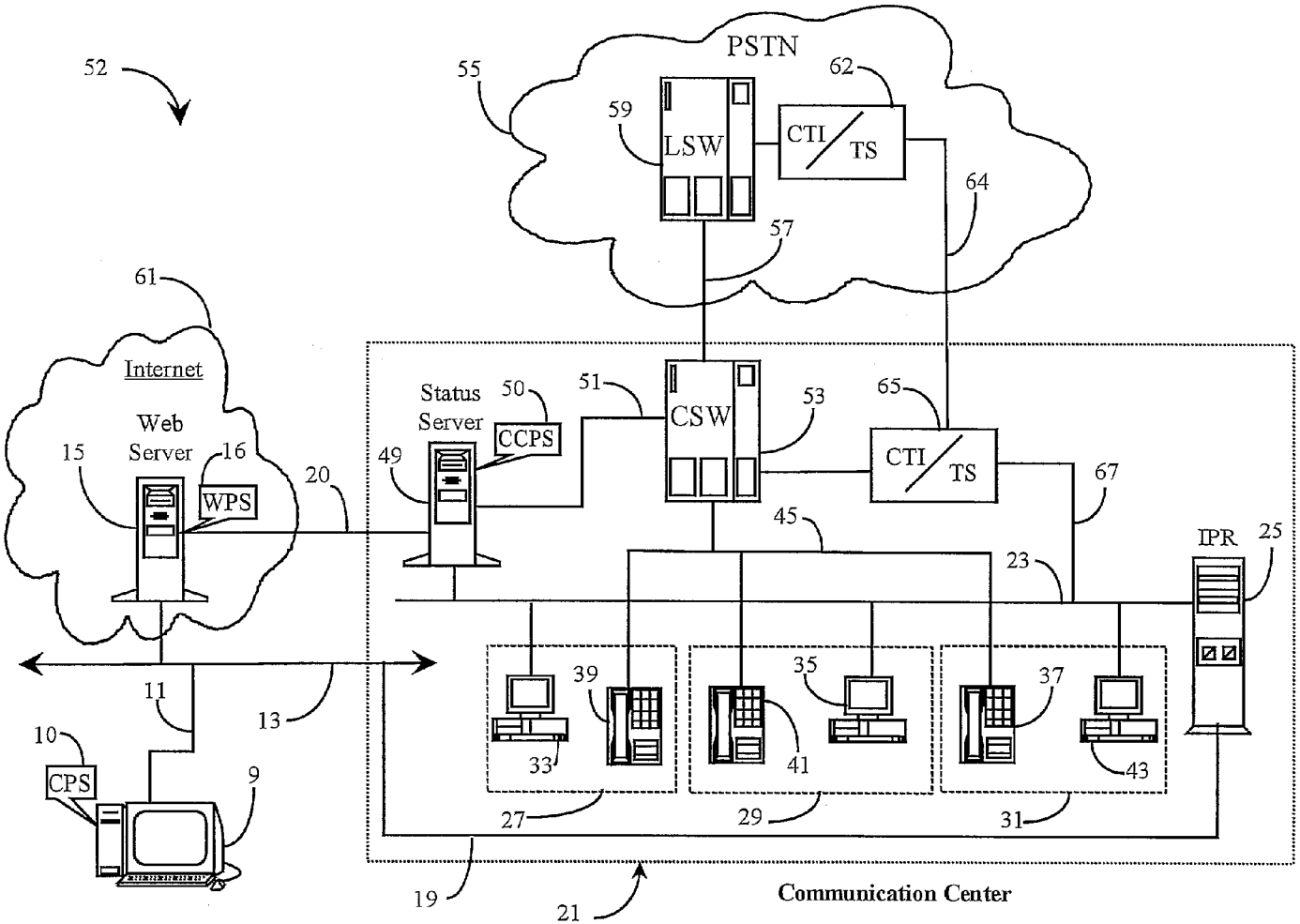
FIG. 1 is an overview of a communication network wherein reporting of communication-center presence information is practiced according to an embodiment of the present invention.

FIG. 1 is an overview of a communication network 52 wherein reporting of communication-center presence information is practiced according to an embodiment of the present invention. Communication network 52 comprises, in this example, a public-switched-telephone network (PSTN) 55, a data-packet-network (DPN) 61, a communication center 21, and an exemplary user 9.

PSTN 55, in this example, represents a preferred network connecting all connection-oriented-switched-telephony (COST) clients who call into communication center 21 for the purpose of doing business with the center. In another embodiment, a private telephone network may be utilized in place of or in combination with PSTN 55. The inventor chooses PSTN 55 because of its high public-access characteristic.

A local telephony switch (LSW) 59 is illustrated within PSTN 55 and represents automated switching capability within the network. LSW 59 may be an Automatic Call Distributor (ACD), a Public Branch Exchange (PBX), or any other type of telephony switching apparatus, in the broadest sense, including but not limited to DNT type switches/gateways as used in VoIP etc. LSW 59 is enhanced for computer-telephony-integration (CTI) by a CTI processor 62 connected thereto by a CTI connection. LSW 59 and CTI processor 62 may encompass various communication functionalities made available at network level by communication center 21. For example, an instance of CTI software known to the inventor and termed Transaction Server (TS) is provided within CTI processor 62 and adapted to enable communication-center 21 to certain call-switching and routing aspects performed by LSW 59. LSW 59 is connected to a central telephony switch (CSW) 53, illustrated within communication center 21, by a COST telephony trunk 57. CSW 53 may be any one of several types of call processing switches as previously described with respect to LSW 59 above.

CSW 53 is enhanced by a CTI processor 65, which is connected thereto by a CTI connection as was described with reference to LSW 59. CTI processor 65 also has an instance of TS software provided therein and adapted to communicate with TS software of processor 62. Processors 62 (network) and 65 (communication center) are connected by virtue of a separate data network 64 enabling the above-described communication between TS instances. By using network 64 to connect processor 62 and 65, communication center 21 may, in addition to controlling call switching and routing within PSTN 55, receive information about callers ahead of actual calls arriving at CSW 53 for internal processing. This enhancement is known as double-dipping by the inventors.

DPN 61 is, in this example, the well-known Internet network and will hereinafter be termed Internet 61. Internet 61 facilitates all Internet-protocol (IP) callers reaching communication center 21 through the Internet. Internet 61 may instead be a private or corporate Wide Area Network (WAN), or any other type of DPN as long as Internet communication protocols are supported. The inventor chooses Internet 61 as a preferred network because of it's high public-access characteristic. IP callers calling into communication center 21 may interface from any Internet-connected server, which provides network access to communication center 21. Moreover, there may be many such servers distributed throughout network 61, each server being a point of access.

Internet 61 has an Internet backbone 13 illustrated therein. Backbone 13 represents all the lines, equipment, and connection points making up the Internet network as a whole, including sub networks. A Web Server (WS) 15 is provided within Internet 61 and is connected to backbone 13. WS 15 is adapted as an Internet file server as is known in the art. WS 15 represents one of a possible plurality of distributed customer-interfacing servers as described above. WS 15 serves electronic information pages, termed Web pages in the art, to requesting users. WS 15 is in this example hosted by the entity hosting communication center 21 and is utilized as a customer-interfacing server.

WS 15 is enhanced with a software instance termed Web-Presence-Software (WPS) 16, which enables prospective customers of communication-center 21 to view communication-center status related to agent availability for a call before deciding whether or not to actually place a call to communication center 21. More about WPS 16 is provided later in this specification.

An exemplary user, illustrated herein as a PC icon labeled with the element number 9, is connected to Internet backbone 13 by virtue of an Internet connection-line 11. User 9 is assumed, in this example, to be accessing WS 15 through standard Internet-connection capabilities as are known in the art. Typically, user 9 would obtain access to WS 15 through a dial-up connection utilizing an Internet-service-provider (ISP) and PSTN 55. However, there are many other means which may be used to obtain an Internet session with WS 15, many of which may not require dialing, e.g. DSL, cable modems etc. User 9 may utilize some other Internet-capable appliance than the PC illustrated herein. Likewise, connection line 11 may be a wireless link, a cable-modem connection, or any other known Internet connection means.

An instance of software termed Customer-Presence-Software (CPS) 10 is provided to execute on customer-premise-equipment (CPE), which in this case is a PC operated by user 9. CPS 10 is adapted to integrate communication-center status information into a customer's electronic interface, which is typically an electronic-information-page (Web page) served to the customer by WS 15 upon the customer's request. CPS 10 is an optional implementation in this example and is described in more detail later in this specification.

Communication center 21 has an Internet Protocol Router (IPR) 25 illustrated therein and adapted to handle incoming communication events sourced from WS 15 or any other interfacing Web server over network connection 19. IPR 25 routes incoming events to agent workstations adapted to receive the events. Agent workstations 27, 29, and 31 are illustrated within communication center 21 and adapted for communication-center activity covering both IP and COST transactions.

Agent telephones 39 (workstation 27), 41 (workstation 29), and 37 (workstation 31) are provided to handle COST communication events. Telephones 39, 41, and 37 are connected to CSW 53 by internal telephony wiring 45. Each agent workstation 27, 29, and 31 has a personal computer/video-display unit (PC/VDU) provided therein and adapted for handling IP communication events and for receiving information about callers calling from PSTN 55. These are PC/VDU 33, PC/VDU 35, and PC/VDU 43 respectively.

PC/VDU's 39, 35, and 43 are connected to a Local-Area-Network (LAN) 23. LAN 23 is, in this case, enhanced for Internet communication. IPR 25 is connected to LAN 23 and functions as an event router as previously described above. Other equipment may also be connected to LAN 23 such as a customer information server (CIS), a statistical server, and other communication-center systems and equipment not shown here but assumed to be present. Processor 65 is connected to LAN 23 by a LAN connection 67. In this way, information about COST callers being handled at LSW 59 may be routed over LAN 23 to destination PC/VDUs such as PC/VDU 35 in station 29 for example. Information about COST callers can also be handled by CSW 53 and routed over LAN 23 to destinations.

It will be apparent to one with skill in the art, that there may be many more workstations manned by communication-center agents than are illustrated in this embodiment without departing from the spirit and scope of the present invention. Similarly, there may be many more CTI functions represented herein without departing from the spirit and scope of the present invention. For example, IVR capability may be present at LSW 59, as well as at CSW 53. Automated systems such as automated fax systems and e-mail systems may also be present. There are many possibilities.

A status server 49 is provided within communication center 21 and adapted to monitor agent status and availability for receiving incoming communication events. Status server 49 is connected to LAN 23 by virtue of a LAN connection and monitors status at each workstation 27-31. Software used for this purpose is not illustrated in this embodiment, but may be assumed to be present and operational within server 49. Agents manning stations 27-31 may monitored as to how many calls are in their respective queues whether they are COST queues, IP queues, or virtual queues of either type. Estimated waiting times for each queue of each agent are determined using call-handling statistics available within center 21. The information gathered to be made available t users may also be more extensive in scope, involving status of groups of agents and the like. Server 49 is capable of monitoring the status of each agent in real-time, but for practical purposes, may perform periodic status checks on a frequent basis such that real-time parameters are closely emulated. All current status information for every agent logged on to LAN 23 is compiled by server 49 and maintained as long as it is current.

An instance of Communication-Center-Presence Software (CCPS) 50 is provided within server 49 and adapted to interface with agent-monitoring software per instance of client request initiated through WS 15. Status server 49 is, in this embodiment connected directly to WS 15 by a separate high-speed data link 20. This implementation is not specifically required to practice the present invention, however the presence of link 20 enhances server-to-server communication. In the absence of data link 20, all communication between WS 15 and status server 49 would be conducted over Internet connection line 19, through IPR 25, and over LAN 23.

In practice of the present invention in one preferred embodiment, user 9 accesses Internet 61 over Internet connection line 11 and logs into WS 15. WS 15 serves a Web page as a response to a request from user 9. The Web page requested is hosted by the entity hosting communication center 21 and therefore contains information about communication center 21 including contact links, product information, telephone numbers, and any other pertinent information that may be found on a customer interface. In addition to the more typical information contained in the Web page representing communication center 21, a Web form (not shown) is made available for the purpose of taking a user's status request before requiring the user to place an actual call or initiate any contact with center 21.

The Web form, which is part of WPS 16, allows a user to enter such information as a product description, profile information, or a purpose for the desired contact with communication center 21. WPS 16, upon receiving and registering a request from user 9 sends an instant message/request over high-speed data link 20 to status server 49. CCPS 50 parses the request and obtains the most current status information from server 49 that matches the intent of the request. For example, if user 9 desires to purchase a four-wheel drive pickup, and communication center 21 is a car dealership, then CCPS 50 will only obtain status information connected to those agents within center 21 responsible for four-wheel drive sales.

Once status information is obtained by server 49, it is sent in the form of a response from server 49 to WS 15 whereupon it may be made available to user 9. In another embodiment, the status response may be sent to user 9 along with a subsequent Web page whereupon the information is caused to be a part of the web page at the location of user 9. In this case, CPS 10 would incorporate the information into the display of the subsequent Web page.

In still another embodiment, CCPS 50 may obtain all of the current agent-status information available from communication center 21 and send it to WS 15 over link 20 on a periodic or real-time basis. WPS 16 would, in this case, the enhanced with a filtering capability of filtering status information that closely matches a user request. Also in this case, an instant message would not need to be sent from WS 15 to status server 49.

In a simple embodiment, status information viewable by user 9 would include any listed agents, number of calls in their queues, and estimated time waiting for agent availability with respect to each queue. For example, agent JIM may have 5 COST calls waiting, 5 IP calls waiting, and 8 unanswered e-mails. Therefore, agent Jim may be considered unavailable for immediate service. An estimated time waiting for Jim to respond may be averaged over all his media types, or maybe specified for each media type. User 9 may initiate a refresh action in order to obtain an update of status information. Contact links and other options may be presented in association with listed agents and agent status figures.

An interface of the type described above enables users to essentially browse agent-availability statistics before initiating any type of contact with communication center 21. In the event that a response message or downloaded interface reveals an available agent, user 9 could initiate contact with that agent using provided contact links or information.

It will be apparent to one with skill in the art that there are many configuration possibilities that exist with respect to reporting agent-availability status of agents within communication center 21 to requesting user 9 without departing from the spirit and scope of the present invention. Instant messaging or embedding the information into Web pages before or after download are techniques which may be employed to practice the present invention. Likewise, the status information may be made a part of a Web browser's tool bar or caused to open in an interactive window that pops up on a user's screen when the data is ready for display. In still another embodiment user station 9 may contact IPR 25 via connection 11, 13, 19 and retrieve pertinent information maintained through CCPS 50. This data may be displayed independently or integrated with a Web page from server 15. The functionality of WPS 16 at Web server 15 in retrieving information from communication center 21 via CCPS 50 is but a single example of how a system according to the present invention may function. It has been described that similar functionality may be provided by CPS 10 at a client station, and that there is no limitation to the client station operating only through a Web server. In a broad sense, the means of communication of client station 9 with communication center 21 is not limiting to the invention. The cooperation of gathering software (CCPS 50) at a communication center with an interface software (CPS 10) at a client station is novel.

In a further aspect, there are a variety of ways that the client stations in such a system may become enabled. In the system wherein retrieval of communication center status info is by software (WPS 16) at server 15, there is no need for additional software at the client station. A conventional browser will do. In the cases wherein software CPS 10 is enabled at a client station, that software may be sent to a client on a CD (for example), sent to the client in the background on accessing a Web page at server 15, downloaded intentionally by a client at station 9 as a plug-in to a Web browser, and in other ways as well.

Figure 2:
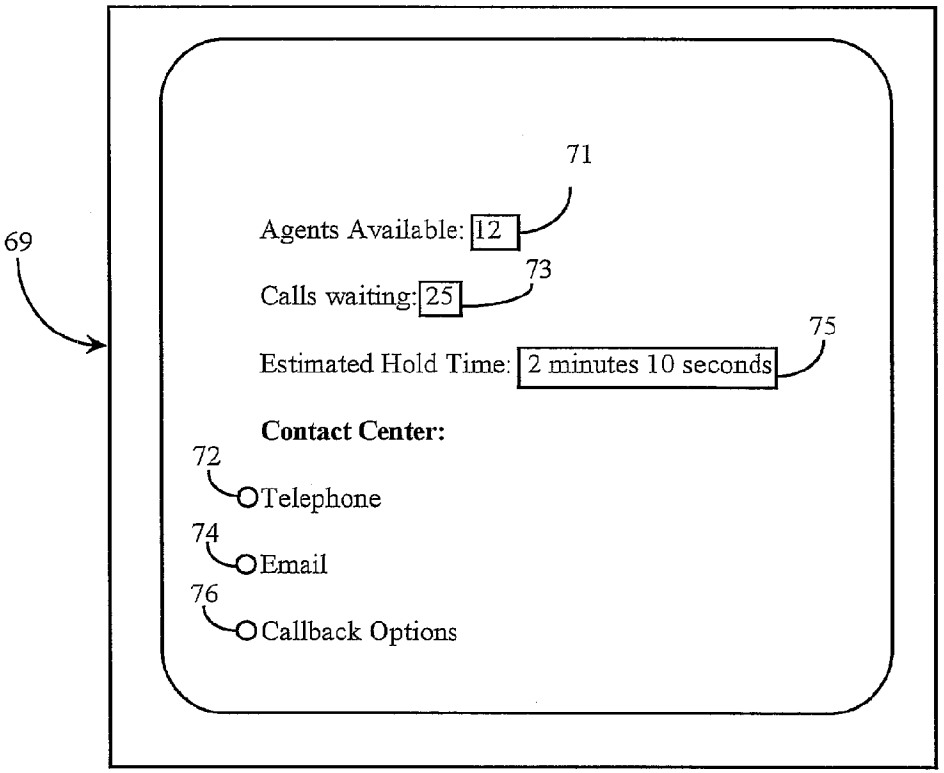
FIG. 2 is a plan view of a client-side media-interface containing status information according to an embodiment of the present invention.

FIG. 2 is a plan view of a client-side media-interface 69 that contains status information according to an embodiment of the present invention. Interface 69 is an exemplary representation of a customer interface displaying agent-availability status after it has been requested and delivered. Interface 69 may be an integrated part of a Web page (incl. e.g. script, Java, Java script, X-Windows script, plug-in etc. etc.), a pop-up information window, an instant message interface, or any other mechanism of computerized display.

In one embodiment, interface 69 is a product of CPS 10 of FIG. 1. In this embodiment, WPS 16 of FIG. 1 sends agent-availability information to user 9 over Internet connection 11, 13, 19, and CPS 10 incorporates information into an interactive display-window or into the actual Web page served by server 15. In another embodiment, interface 69 is a product of WPS 16 in FIG. 1 and is embedded into the actual Web page before it is served to user 9. In still another embodiment, interface 69 is a product of WPS 16 and is served to user 9 in the form of a standard instant-message interface using any of several known protocols.

In this basic example, agent-availability status is generalized to a group of agents and displayed as 3 parameters. These are a number of available agents 71, a number of calls waiting 73, and an estimated hold time 75. In this case the information represents the most basic information available for the target group of agents. In this case there are 12 available agents that are handling the subject of request resulting in interface 69. There are 25 calls waiting in a queue shared by the 12 available agents. The average estimated hold time for one of the 12 agents to respond to an immediately placed call is 2 minutes and 10 seconds.

In this example, three interactive options are presented within interface 69, in this case, below the agent-availability information. A contact option 72 is provided to allow a viewing customer to initiate an IP-to-IP telephone call, or an IP-to-COST telephone call. A contact option 74 enables a viewing customer to send an e-mail, which would be routed to one of the 12 available agents. A contact option 76 enables a viewing customer to initiate a callback from one of the 12 available agents. Using callback option 76 enables an invoking user to be entered into a virtual queue. A user in this case may expect a callback at approximately 2 minutes and 10 seconds after initiating the contact. In actual practice, the availability and variety of interactive contact options is dependent upon enterprise rules and available media. One with skill in the art will recognize that there are many alternative display scenarios which may be used with interface 69.

In a more advanced case, interface 69 may contain much more detailed information including information that a specific to a user request invoking the interface. For example, each of the available agents 71 may be listed separately instead of collectively as illustrated herein. The number of calls waiting may be broken down to reflect the exact number of calls waiting for each available agent. Furthermore, estimated hold times may be determined individually for each busy agent. Likewise, additional information about agents may be listed such as skill levels, language preferences, ranking within the organization, and so on. The level at which detailed agent-availability data may be compiled and presented depends entirely on the sophistication and configuration of agent monitoring software in use within communication center.

Figure 3:
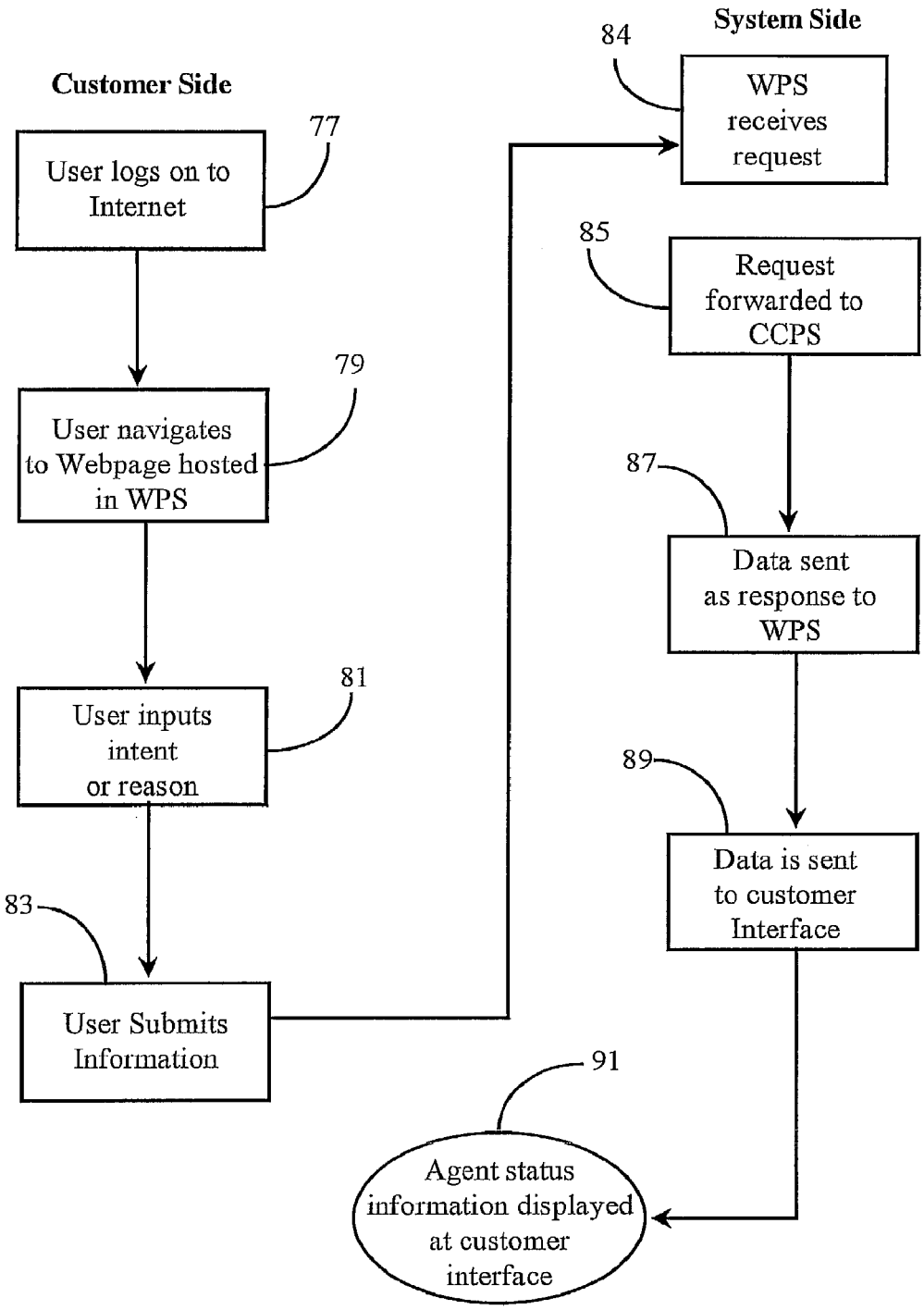
FIG. 3 is a flow diagram illustrating client and system procedural steps for practicing communication-center presence reporting according to an embodiment of the present invention.

FIG. 3 is a flow diagram illustrating client and system procedural steps for practicing communication-center presence reporting according to an embodiment of the present invention. At step 77, the user logs onto a DPN, which in a preferred case, is the Internet network. At step 79, the user of step 77 navigates to a Web site hosted by a communication center that the user desires to contact. At this point, a Web form may be present on a main Web page of the Web site navigated to in step 79. Such a Web form would prompt a user for his or her intent or reason for the desired contact. These reasons are as wide-ranging as are enterprises that might host such a Web form. For example, a list of product descriptions may be presented for selection. Levels of contact priority may be established in the case of priority queuing, amongst others possibly based on user ID. Available options are limited only by enterprise rules.

At step 81, a user enters the information solicited from him or her by the above-described Web form. At step 83, the user submits the Web form. At step 84, a Web presence server analogous to Web server 15 of FIG. 1 receives the request sent by the user of step 83. At step 85, the Web presence server forwards the request received in step 84 to a communication-center presence server analogous to server 49 of FIG. 1.

At this point, software analogous to CCPS 50 of FIG. 1 analyzes the received request and pulls the most current agent-availability data for the purpose of servicing the request. At step 86, the applicable data is sent in the form of a response back to the Web presence server of step 85. It is noted herein, that this communication between servers may occur over a separate high-speed data line as was described in reference to FIG. 1 above. Moreover, the server-to-server transaction may follow known request/response models used in Internet transactions.

When the applicable data is received at the Web presence server, software analogous to WPS 10 of FIG. 1 may integrate the information into a subsequent Web page to be sent back to the user of step 77, or it may formulate the response as an instant message, which is immediately dispatched act to user 77. At step 87 then, the applicable data is delivered to the user of step 77 and is displayed as an interactive interface analogous to interface 69 of FIG. 2 at step 89. At this point, the user of step 77 may initiate contact with the target communication center or wait for a better time for contact initiation based on user-analysis of the received data. It is also noted herein that the user requesting the data may refresh his or her request periodically to obtain the most current agent-availability data during a session period. In some cases, the requesting user may receive streaming data in real-time showing continual changes in agent-availability status over the time spent viewing the interface.

It will be apparent to one with skill in the art, that the customer/system process steps illustrated in this example may be altered in description and order without departing from the spirit and scope of the present invention. For example, the Web presence server of step 84 may have a local access to the most current agent-availability data at the instant of receiving a request. This was described an embodiment wherein agent-availability data from the target communication center is periodically pushed or continually streamed to the Web presence server. Moreover, the agent-availability data may be integrated into a Web page at server side or client side dependent upon software implementation. In one embodiment, the entire transaction process from request to response and display is conducted using an instant message protocol.

The method and apparatus of the present invention may be practiced on the Internet, a private or corporate WAN or LAN network or in any combination thereof. Web server 15 of FIG. 1 may be hosted by a single communication center or shared by a plurality of communication centers. In the latter case, it is more likely that agent-availability data will be pulled from the providing communication centers rather than pushed to the central location.

Client-Status Monitoring Capabilities

In another aspect of the present invention an enhancement is provided that enables agents operating from within communications-centers to monitor client availability status for the purpose of callback optimization. In particular, in cases where the client has many media available, a collection of all media statuses is generated, and then presented as an amalgamated status to an agent or robotic agent. Additionally, the preferred mode and time for a back connection may be available as well.

In one aspect of the system, client on-/off-line status information and the client's callback preferences are obtained at the same time using the same protocol. In another aspect of the system, client on-/off-line status information and the client's callback preferences are obtained independently, for instance using a presence service such as ICQ™ for the on-/off-line status information and HTTP or WAP for obtaining the client's callback preferences, or for instance during a previous communication between the client and an agent of the communication center.

In one aspect of the system, client-status information is obtained from a single client terminal, such as a PC. In another aspect of the system, partial client-status information is obtained from multiple independent client terminals, such as a PC and a cellular phone, and combined to provide complete client-status information to the subscribing agent. In one aspect of the system, client on-/off-line status information is obtained concerning a single terminal device, such as a PC. In another aspect of the system, client on-/off-line status information is obtained concerning multiple independent terminal devices, such as a PC and a cellular phone, and combined to provide complete client on-/off-line status information.

In one aspect of the system, client-status information is obtained using a single protocol, such as ICQ™. In another aspect of the system, partial client-status information is obtained using multiple protocols, such as ICQ™ and MSN Messenger Service™, and combined to provide complete client-status information to the subscribing agent. In one aspect of the system, client-status information is obtained via a single network, such as the Internet network. In another aspect of the system, partial client-status information is obtained via multiple networks, such as the Internet network and the cellular network, and combined to provide complete client-status information to the subscribing agent.

Figure 4:
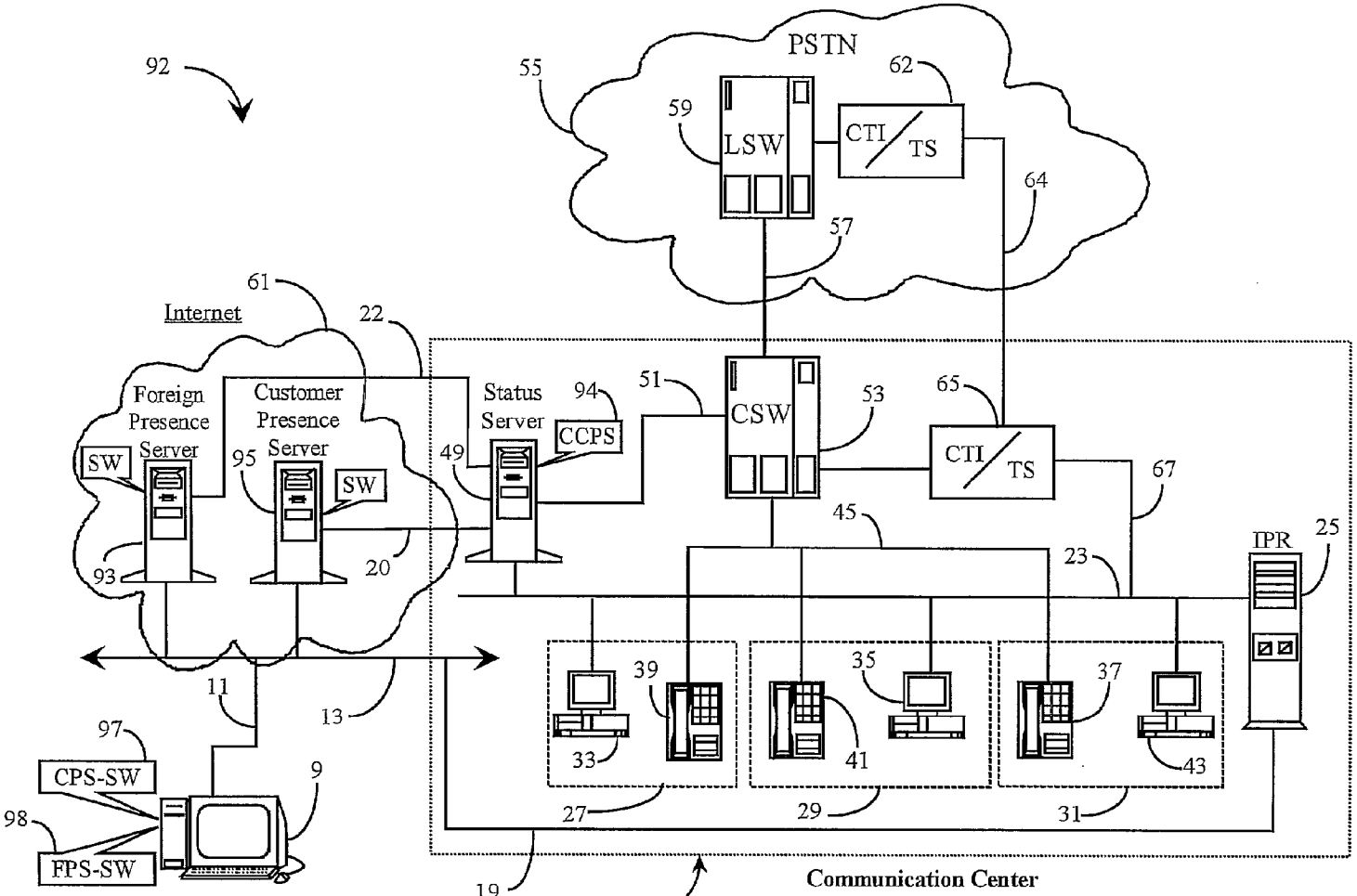
FIG. 4 is an overview of a communications network wherein agent monitoring of client status is practiced according to an embodiment of the present invention.

FIG. 4 is an overview of a communications network 92 wherein agent monitoring of client status is practiced according to an aspect of the present invention. Communication network 92 is somewhat analogous to communications network 52 of FIG. 1 above in terms of basic architecture and software implementation. Elements of network 52, which are not modified for the purpose of enabling the present invention are not re-introduced with new element numbers. Newly provided or modified elements used in the practice of the present invention are introduced herein having new element numbers.

Communication network 92 comprises PSTN 55, DPN 61, communication center 21, and an exemplary user 9 as described above with reference to network 52 of FIG. 1.

PSTN 55, as described in the example of FIG. 1, represents a preferred network connecting all connection-oriented-switched-telephony (COST) clients whom call into communication center 21 for the purpose of doing business with the center. In another case, a private telephone network may be utilized in place of or in combination with PSTN 55. The inventor chooses PSTN 55 because of its high public-access characteristic.

LSW 59, illustrated within PSTN 55 and represents automated switching capability within the network. LSW 59 may be an Automatic Call Distributor (ACD), a Public Branch Exchange (PBX), or any other type of telephony switching apparatus, in the broadest sense, including but not limited to DNT type switches/gateways as used in Voice over IP (VoIP) etc. as was previously described. LSW 59 is CTI enhanced by CTI processor 62 connected thereto by a CTI connection. TS software provided within CTI processor 62 enables communication center 21 to control certain call-switching and routing aspects performed by LSW 59 as was described in FIG. 1.

LSW 59 is connected to CSW 53, illustrated within communication center 21, by COST telephony trunk 57. CSW 53 may be any of several types of call processing switches as previously described with respect to LSW 59 above. CSW 53 is enhanced by CTI processor 65, which is connected thereto by a CTI connection as was described with reference to LSW 59. CTI processor 65 also has an instance of TS software provided therein and adapted to communicate with TS software of processor 62. Data network 64 provides a capability of double dipping described in FIG. 1 above. Internet 61 facilitates all Internet-protocol (IP) callers reaching communication center 21 through the Internet. Internet 61 may be a private or corporate Wide Area Network (WAN), or any other type of DPN as long as Internet communication protocols are supported. The inventor chooses Internet 61 as a preferred network because of it's high public-access characteristic, as stated with reference to FIG. 1. IP callers calling into communication center 21 may interface from any Internet-connected server, which provides network access to communication center 21. Moreover, there may be many such servers distributed throughout network 61, each server being a point of access. Internet 61 is represented by Internet backbone 13, which represents all the lines, equipment, and connection points making up the Internet network as a whole, including sub networks.

Status server 49 is illustrated in this example as having a communication-center-presence-server CCPS 94 (software) installed therein, which is an enhanced version of CCPS 50 described in the example of FIG. 1. CCPS 94 not only provides clients with agent status information over the WWW, but also allows agents working within center 21 the capability of subscribing to client status information. More detail regarding the just-described enhancement is provided below.

In this example, there are 2 exemplary file servers illustrated as connected to Internet backbone 13. These are a customer presence server (CPS) 95 and a foreign presence server (FPS) 93. It is noted herein that CPS 95 effectively replaces WS 15 of FIG. 1 and can be assumed to provide the formerly-described functionality of server 15 and associated web presence server (WPS software) 16 of the same example. CPS 95 functions as a file server enhanced with an instance of software (SW) 97, which may be described, in this embodiment as CPS software 97. CPS server 95 is, in this example, hosted by the same entity hosting communication center 21 and is utilized as a customer/agent interface.

CPS SW 97 is enhanced for the purpose of allowing an agent to subscribe to real-time customer availability information as it applies to the remote station occupied by the customer. In this case, the station refers to remote PC 9, also referred to as user 9 in this specification. User 9 is connected to backbone 13 by Internet-access line 11, as was described with reference to FIG. 1. CPS 95 is optional in this example and not specifically required in order to practice the present invention. CPS 95 represents a collection server that is utilized for collecting and organizing user status-states, which may be subscribed to or otherwise accessed by agents of center 21.

FPS server 93 is adapted as a third-party server similar to those employed by well-known chat and instant messaging services. FPS 93 may be assumed to have software installed therein, and is adapted to organize instant communication between clients using a supported instant messaging service operating under a known protocol such as RFC2778 as was described in the example of FIG. 1. It is noted in this example, that CPS server 95 is connected to status server 49 within communication center 21 by high-speed data connection 20. A second high-speed data connection 19 is provided for connecting FPS server 93 to status server 49. In this respect, status server 49 has access capability to both CPS 95 and FPS 93. It is similarly noted herein, that high-speed data-access lines connecting server 49 to servers 95 and 93 are not required in order to practice the present invention. Server 49 may instead of adapted to connect to Internet backbone 13 using a 24×7 or a switched Internet connection.

In this embodiment, CPS 95 is hosted by center 21 and adapted to function in much the same way as FPS 93. That is to say that CPS 95 is a central facility for interaction. In one embodiment of the present invention, CPS 95 is not present and CPS SW 97 is instead distributed directly to client machines, as in this case, CPS SW 97 illustrated as installed in PC 9. It is noted herein that the functionality of CPS 10 of FIG. 1 is included in the enhanced version, or CPS SW 97 shown on PC 9. In the absence of server 95, with client machines enhanced by SW 97, CCPS 94 interacts directly with the customer.

User 9 may be assumed, in this example, to be accessing either FPS 93, or CPS 95 for the purpose of determining agent status information as described in FIG. 1 and for making status information available to subscribing agents.

IPR 25 handles incoming message events sourced from FPS 93 and/or CPS 95. Other than enhanced functionality represented by server 49 running CCPS 94 and dual connection capability from server 49 to CPS 95 and FPS 93, communication center 21 operates identically to the center (21) described in FIG. 1 including the configuration of agent's workstations and so on. Therefore, detailed re-description of the agent's operating environment (workstations, LAN connectivity, etc) need not be provided in this example.

In one embodiment of the present invention, PC 9 has a known instant-messaging software application installed therein and adapted to use FPS 93 as a centralized communication server. An example of one such messaging service would be the well-known ICQ™ service. In this case, CCPS 94 running on status server 49 is adapted to support the particular instant-messaging application employed by user 9 and supported at FPS 93. The instant-messaging application is, of course, assumed to be executing on the client machine, shown here as FPS-SW 97. For example, CCPS 94 may be adapted to recognize various descriptive states-of-activity represented at FPS 93 and associated with real-time communication states of connected users, in this case user 9. Examples of such states available through instant messaging services include indications of whether user 9 may be off-line or online. Other status indications such as "user is away" or "do not disturb" may also be included as standard status indications available with known messaging services.

CCPS 94 may be adapted to integrate an enhanced package of status indicators associated with communication-center use into software running on FPS 93 and on user station 9 such that user station 9 may communicate a variety of enhanced status messages to subscribing agents within communication center 21. It is also noted herein, that the functionality of agent-status indication as taught in FIG. 1-3 above may be integrated into software at FPS 93 and at user station 9 without departing from the spirit and scope of the present invention. One example of an enhanced user-status indication that may be associated with communication center 21 may be an indication that user 9 is temporarily away and preferred contact is by cellular phone during this status period. Of course, the cellular phone number of user 9 would be provided as part of the indication. A communication-center agent, for example, an agent operating PC 43 within workstation 31 may subscribe to FPS 93 utilizing LAN 23, server 49, and high-speed data link 19.

In this case, the agent in question may be in various states of communication with a plurality of users connected to have FPS 93. According to a push model, user-status indications may be pushed in the form of periodic instant messages to PC 43, where they may be viewed by the monitoring agent. The monitoring agent may decide which callback options are appropriate based on user-status indication contained within the content of the instant message. That may be done by other protocol than just IM, e.g. HTTP, WAP, IPNT etc.

According to a pull case, the agent operating PC 43 may subscribe to an interface (not shown) served by FPS 93 such that current status indications are contained within the interface and viewable on PC 43. In this embodiment, status server 49 executing CCPS 94 provides interactive interfaces for both clients and agents for the purpose of viewing status. Also in this embodiment, status server 49 executing CCPS 94 may facilitate COST outbound dialing from agent to client through CSW 53 by virtue of connection 51.

An agent operating at one of connected workstations 27-31 may subscribe to real-time status reports associated with a plurality of users connected to FPS 93. Subscription may be defined as an active state of dialog established between an agent and the connected users. The dialog states may be initiated and established by users contacting agents through the method of the present invention. Therefore, users who have connected to FPS 93 and have initiated contact with an agent of communication center 21 may be considered for status reporting until the purpose of the dialog is achieved or the user is no longer connected to FPS 93.

In some cases, the agent user will not be a human agent but will be a special purpose server (not shown) providing some very specific services. One example of such a special server is a callback server that automatically initiates callback calls to a customer 9 based on that user's callback preferences and routes the call to an agent after the customer answers. Another example of such a special purpose server is a server that monitors the communication center's status and, on request of the customer 9, sends an alert to the customer when the communication center's status matches specific conditions, for instance when the average waiting time is smaller than three minutes.

In a preferred embodiment, there can be multiple FPS and CPS servers in network 92. There can for instance be one FPS 93 for every third-party presence service that is being used in the communication center. There can be for instance an FPS 93 that is able to obtain the cellular on-/off-line status of the customer's mobile (not shown).

In another embodiment, the customer can have multiple terminal devices such as a PC 9 and a cellular phone (not shown). For each type of terminal equipment there can be a different FPS 93 to obtain the on-/off-line status of the customer. By combining these partial statuses (SW not shown), for instance in CCPS 94, a complete customer status can be presented to the subscribing agent. In one aspect, the CCPS 94 can combine the presence information of the customer. In another aspect, the customer's PC 9 can combine the presence information. Take for instance the case where the PC is equipped with a modem-board and where the customer's telephony is also connected to that same modem-board. In this case, the client's PC 9 can combine the client's on-/off-line status for the customer's fixed line and for the customer's internet access and his ability to participate in a chat session or a net-meeting, etc.

In some cases the agent doesn't necessarily have to subscribe for agent status info to the CPS or FPS, the CCPS could take over this job (e.g. agent doesn't use IMPP to subscribe but proprietary protocol). In the latter case the CCPS could subscribe to the CPS or FPS. Generally, it is better to have a call center node subscribe to all different types of CPS and FPS nodes, because there is a need or preference, to combine the customer status information from those different nodes into one presentation for the agent. In some other cases, this CCPS functionality could run on a dedicated node, could be combined with other functionality on a separate node (e.g. embedding the status information in web-page), could run on the agents workstation (or node in case of automated agent), etc.

In another aspect of the present invention, CPS 95 executing CPS SW 97 functions as a status broker in much the same way as FPS 93. The exception being that CPS 95 is provided as a dedicated customer interface for the sole purpose of communication with communication center 21. In this aspect, the instant messaging application, SW 97, is proprietary and contains all of the status options and communications options supported by center 21 and does not have to be integrated with an existing instant messaging service. Provision of CPS 95 executing CPS SW 97 enables an agent operating one of workstations 27-31 within center 21 to subscribe to a single interface containing real-time or periodically updated status reports concerning all of the connected users which may be in dialog with the agent. In one embodiment, instant messages may be propagated in a push model as described above, instead of having subscription to an interactive interface.

Although in many cases the agent will not be communicating synchronously with the customer while receiving these customer's status info, it is possible to allow that, for example in cases where both the agent and the client need to do something, while communicating as well.

As previously described above, CPS 95 is optional and is intended to represent the central "place of status exchange" between agents and users, including but not limited to requests, etc. for dialog. According to another embodiment of the present invention CPS SW 97 is distributed directly to client PC stations similar to PC 9 as illustrated herein. In this case, status server 49 executing CCPS 94 functions as an instant message broker (i.e. proxy) between agents operating workstations 27-31 and users represented herein as user 9. In this case user 9 would log into a web server analogous to web server 15 of FIG. 1 for the purpose of initiating contact with communication center 21. Because and interfacing server is used to interface a plurality of users to communication center 21, both instant message type status reports and status reports contained with an electronic information pages (web pages) are possible.

In some cases, signaling may be sent over the IM protocol, although typically, the other media will provide their own protocol, which will be used respectively, such as H.323 or SIP for IPNT.

In still another embodiment, user 9 initiates direct contact to communication center 21 by virtue of a client-installed version of CPS SW 97, which would contain all of the appropriate contact mechanisms needed to effect IP-to-IP or IP-to-COST connections over the appropriate network paths to center 21. In this embodiment, server 49 executing CCPS 94 may still be used as an agent-interface server, to which agents operating stations 27-31 may subscribe to be in order to view current user status, including but not limited to IP-to-IP events. It is noted herein, that IP-to-COST events would arrive at communication center 21 after having been routed through PSTN 55 through an appropriate gateway. However, when such events arrive at CSW 53 for internal routing, a channel may be opened from server 49 to the node, which is in this case PC 9, from which the incoming event originated if the addressing information is included in the arriving COST event. In this scenario, an agent may interact with a user from a COST telephone and view that user's status information simultaneously. If for some reason the agent must terminate the call, the agent may still subscribe user's online status through the connection established to PC 9 by server 49. Even though there is no active communication between the contacted agent and the initiating user status regarding connectivity state, callback instructions, and so on is immediately available to the contacted agent. Similarly, agent availability and estimated time of response reports associated with the contacted agent are available to user 9 as long as the connection between user 9 and server 49 is open.

In another embodiment, the on-/off-line status information for user 9 will reach the communication center 21 independently from the callback preference information for that user 9. In one aspect, user 9 can be invited to fill out some form on a web page in order to specify callback preferences. In still another aspect, an agent can be feeding the customer preferences to the system during a communication with that customer 9. In these aspects, the callback preference information can be combined with the on-/off-line status information. In one aspect, the web page can be accessed by the customer using a PC. In another aspect, the web page can be accessed using a mobile device that is for instance WAP enabled. In one aspect, the web-page can be hosted by the FPS 93 or the CPS 95. In another aspect, it can be hosted by another server (not shown).

In still another embodiment, the customer's preferred third-party presence service can be part of the callback preferences. There are many third-party presence services such as, but not limited to, ICQ™ and MSN Messenger Service™. A user 9 that is a member of one these presence services, can allow agents of the communication center to monitor it's presence status by communicating it's preferred presence service to the communication center. In an aspect of the invention a customer that isn't a member of a third-party presence service can be allowed by the communication center to download the tools for a communication center specific presence service.

Figure 5:
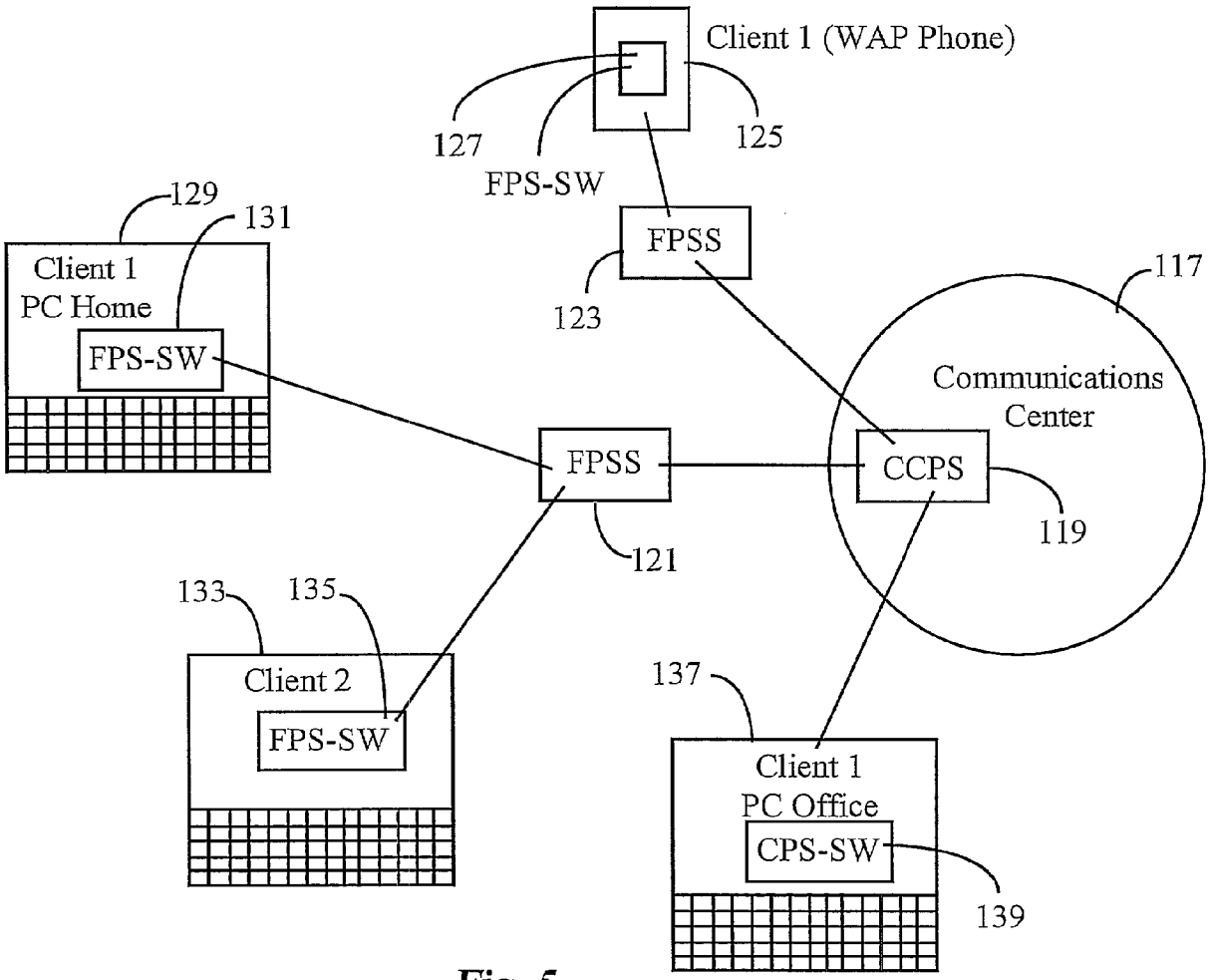
FIG. 5 is a plan view of exemplary agent-side media-interfaces 99 and 101 containing availability status and call-back parameters according to an embodiment of the present invention.

FIG. 5 is a simplified logical connection diagram illustrating functionality of principally software elements in an embodiment of the present invention. In FIG. 5 CCPS 119 is illustrated as operable in a communication center 117 for receiving status from client devices and other information to be provided to agents. As described above, the agents may be live agents or robotic agents.

In FIG. 5 there are two clients (persons) labeled Client 1 and Client 2. There are four client devices 129, 133, 137, and 125, shown in FIG. 5. Client 1 has a PC 129 at his home, which executes an instance of FPS-SW 131, which is, in this case, AOL. Client 1 also has a PC 137 at his office executing an instance of CPS-SW 195. CPS-SW 139 is provided by the host of communication center 117. Further, Client 1 has a WAP telephone 125 executing an instance of FPS-SW 127, provided by Sprint in this example. Lastly there is a second client (Client 2) operating a PC 133, the PC executing an instance of FPS-SW 135, in this example also AOL.

A first Foreign Presence Service Server (FPSS) 121 monitors both instances of AOL (and any other instances at client premises not shown), and provides presence information to CCPS 119, which is enabled for AOL and is executing in communication center 117. A second FPSS 123 monitors WAP telephone 123. CCPS 119 monitors CPS-SW 139 executing on PC 137, although alternatively, there may be an intermediate Client Presence Service Server between PC 137 and CCPS 119, not shown here. Furthermore, in some cases additional servers maybe inserted as proxies etc. between for example FPSS 121,123 and CPSS 119 etc., not shown here.

It may be assumed, for example, that Client 1 in FIG. 5 may move between his PCs and carry his WAP telephone with him, being variously connected and available through the three client devices 125, 129, and 137. Real time monitoring of all of these devices by CCPS 119 directly and through FPSS instances provides valuable information to a real or robotic agent associated with Center 117, together with client preference information which may be achieved by any of several paths, as described above, in real time or according to pre-programmed preferences. The ability of agents, real or robotic, to respond to client's needs is therefore greatly enhanced. The skilled artisan will recognize that both FIG. 4 and FIG. 5 are greatly simplified illustrations, and there may be many more clients, client devices, and instances of FPS and CPS servers and software involved in many ways. The diagrams and accompanying descriptions are provided to convey the essentials of the invention and its functionality.

It will be apparent to one with skill in the art, that the method and apparatus of the present invention may be applied to a variety of connection scenarios without departing from the spirit and scope of the present invention. Similarly, the software of the present invention may be provided in a variety of functionalities ranging from an extendable application program interface (API) to an existing instant-messaging service to a fully functional server-driven service application including client-side and server-side components.

It will also be apparent to one with skill in the art, that instant messages following standard instant message protocol can be sent back and forth between subscribing agents and clients without departing from the spirit and scope the present invention. In addition to instant messaging, status alerts may take the form of pager messages or other types of known alerts when a client status is determined to be off-line.

Figure 6:
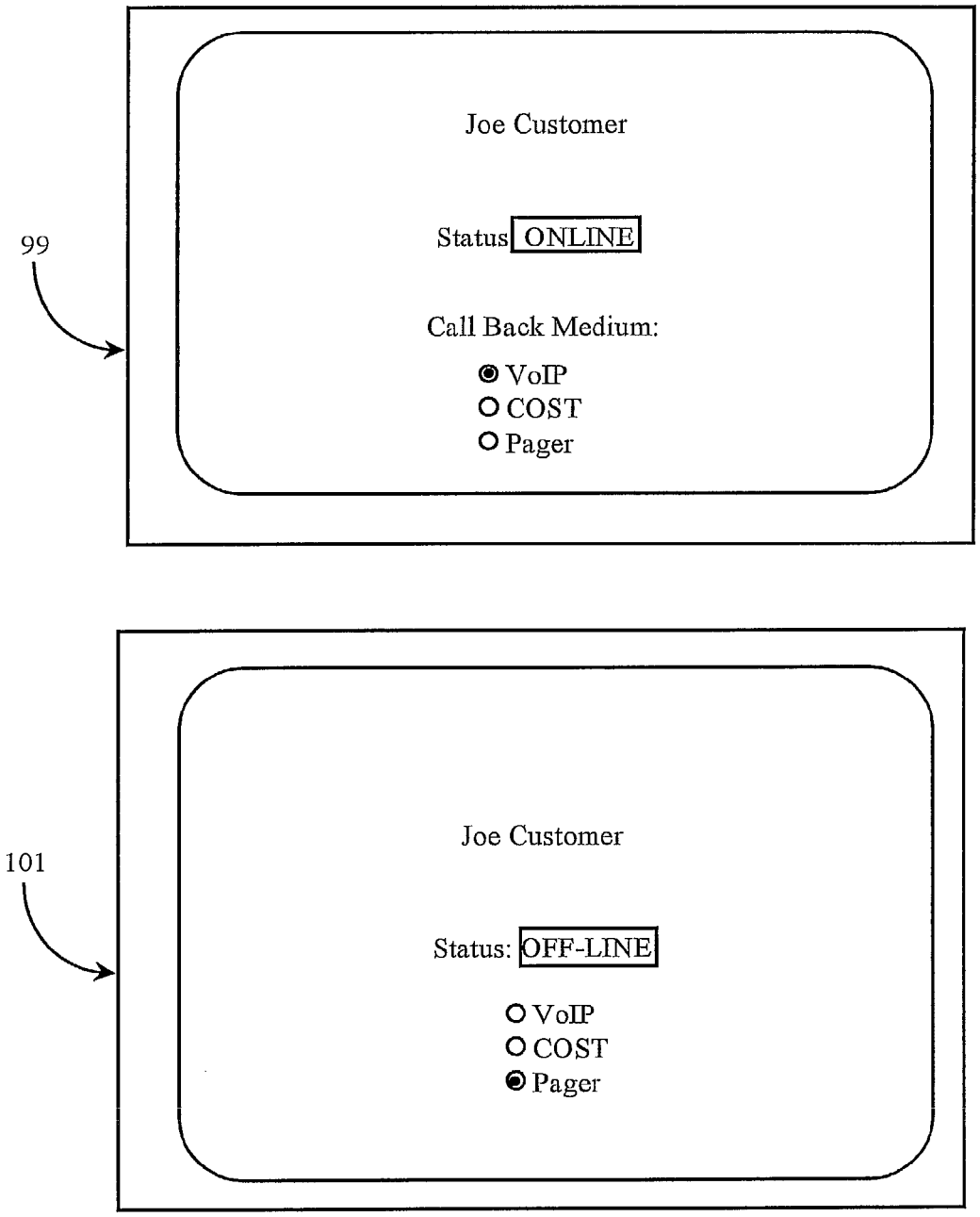
FIG. 6 is a flow diagram illustrating agent and system procedural steps for observing customer status and call back preferences according to an embodiment of the present invention.

FIG. 6 is a plan view of an exemplary agent-side media-interfaces 99 and 101 containing availability status and callback parameters according to an embodiment of the present invention. Interface 99 may take the form of instant message, a messaging window integrated into an electronic information page (web page), or any other graphics interface that may be propagated over network lines to subscribing devices. In this simple example, Joe Customer has a status of ONLINE and the requested callback medium of voice over Internet protocol (VoIP). Other callback mediums listed in interface 99 include a COST medium and a Pager medium.

In a one case, an agent subscribes to the status of Joe Customer during a dialog session typically initiated by Joe Customer. Interface 101 is analogous informed to interface 99 with the exception that the indicated status is OFFLINE. The status depicted in interface 101 is an indication to a subscribing agent that Joe is no longer connected to an interfacing server on the network. If Joe is connected to the network but no activity is recognized for a predetermined period of time, Joe's status may be determined to be AWAY. In this example, interface 101 depicts a pager medium as a preferred callback option.

In another case of the invention, a single agent may subscribe to a plurality of customer status messages simultaneously such that he or she may manage outbound calling in a more optimal fashion. Moreover, because the messaging is bi-directional Joe may receive alerts or messages indicating estimated waiting time for a callback, or perhaps instant message data that resolves the current dialog between Joe and an agent. In the latter case, instant messaging may be used to dispose of calls.

Figure 7:
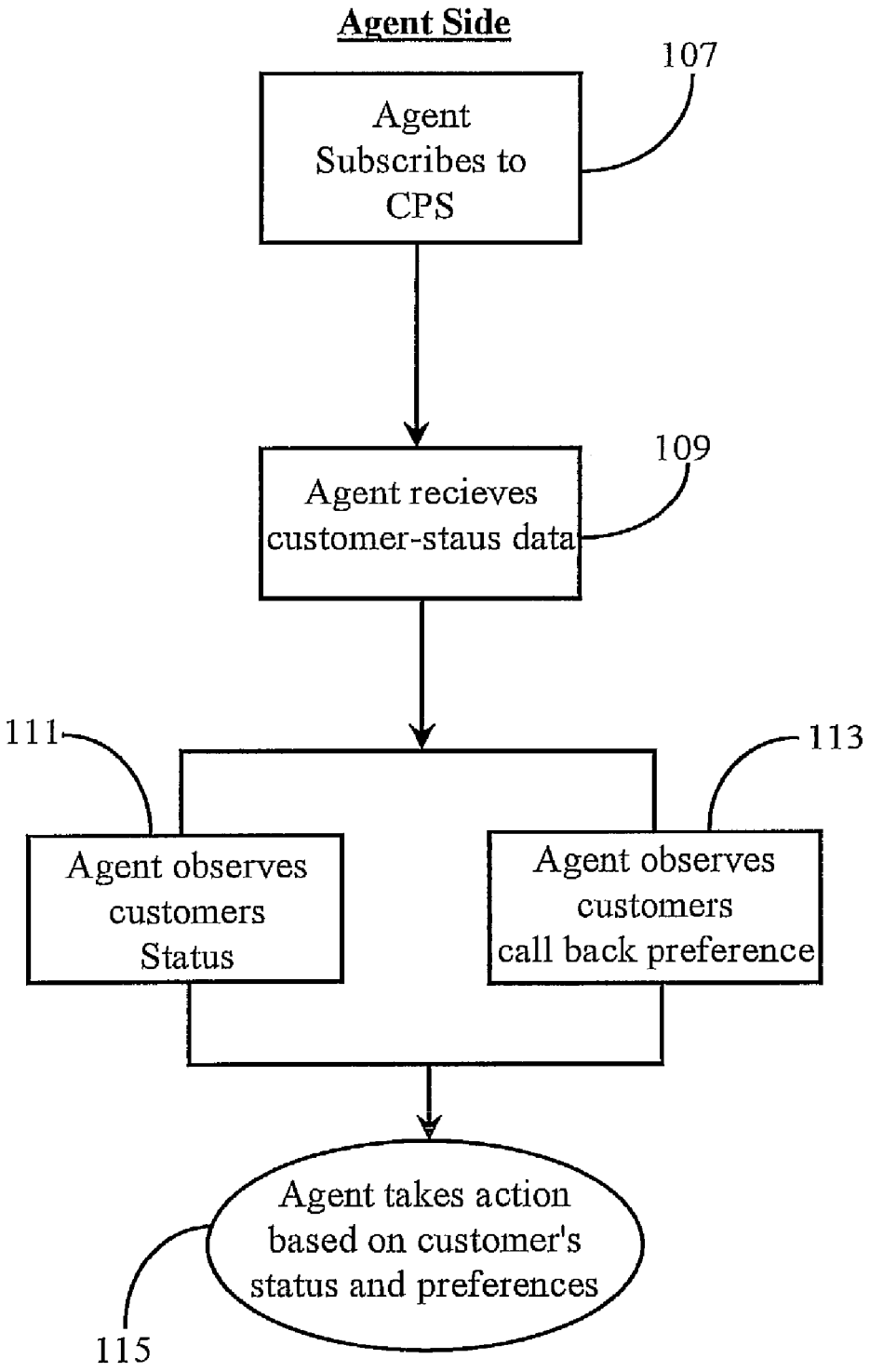
FIG. 7 is a flow diagram illustrating agent and system procedural steps for observing customer status and call back preferences according to an embodiment of the present invention.

FIG. 7 is a flow diagram illustrating agent and system procedural steps for observing customer status and call back preferences according to an embodiment of the present invention. At step 107, a communication-center agent subscribes to customer presence server 95 of FIG. 4, in this case, through status server 49 within communication center 21 described in FIG. 4. It is assumed in this step that the subscribing agent already has at least one customer who has initiated contact with the subscribing agent through server 95. It may be that the subscribing agent is working with a plurality of customers also connected to server 95.

At step 109, the subscribing agent is served one or more instant messages containing customer status information. In one embodiment, a single interface such as a web page containing status data categorized for each customer the agent is working with is served at step 109. In this case, status information related to each customer the agent is subscribing to may be contained in separate windows or lists available within interface. In another embodiment, the subscribing agent may select a customer and receive an instant message regarding that customer's status.

At step 111, the subscribing agent observes the customers status relating to whether the customer it is online or off-line. At step 113, the subscribing agent observes the customer's call back preferences, which may very according to the customer's connection status. Call back preferences may include but are not limited to IP phone, cellular, e-mail, pager, COST telephone, interactive chat, and so on. At step 115, the subscribing agent takes action based on the customer's status and stated call back preferences.

In one case of the invention, CPS 95 may be facilitated as sort of a callback queue wherein a plurality of the agent's customers may be directed to if the agent of contact happened to be busy at the time of contact. During the period of waiting, customer status and call back preferences are propagated to the subscribing agent and estimated times of response and other information they be propagated to the waiting customers. Flexibility exists in this embodiment in that unlike any normal call-waiting queue, the customer is free to move about and even disconnect from the network and go about normal business while waiting for a callback.

In the case of a customer terminating his connection with server 95, the subscribing agent will be served an instant message reflecting the customer's off-line status and a medium wherein the agent may contact the customer off-line such as a COST telephone, a pager, or some other off-line medium.

In another case of the invention, a priority state may be applied to the plurality of customers waiting for a response from a particular agent. In this embodiment, the customers may subscribe to estimated-waiting time alerts regardless of whether they are online or off-line. For example, a customer may indicate that an alert be sent to his or her paging device approximately five minutes before an agent is estimated to respond by calling the customer on his or her cell phone the event that the customer has gone off-line from the interfacing server. The subscribing agent is served the off-line status, which includes the preferred call back medium and the appropriate cell phone number to call. The page alert to the customer they be propagated by the interfacing server if the server is equipped with outbound dialing capability into a telephony network. In this case the server has the communication-center status information of the agent including the estimated times for the agent to handle his or her calls in queue.

The method and apparatus of the present invention may be practiced over a communications network comprising any combination of Data-Packet, COST, and wireless networks utilizing appropriate gateways without departing from the spirit and scope of the present invention. Moreover, many variations of customer states and agent states may be included as options for configuration into the software the present invention. For example, a client may configure as many devices into the system as desired for enabling agent callbacks under a variety of circumstances. Similarly, an agent may subscribe singularly or in a plural sense to specific customer states.

In still another case of the invention, a central server such as CPS 95 of FIG. 4 may be dedicated to communication-center 21 such that all interfacing customers have status interfaces which are available to all subscribing agents. In this case, subscribing agent may browse and subscribe to selected customer states based on agent/customer match-up. For example, a subscribing agent specializing home loans for example, may log into the system and subscribe to any customers connected the system who have initiated an inquiry to communication center 21 regarding loans. There are many variant possibilities.

Personal Interaction Client-Center Interface

According to another aspect of the present invention, a personalized client-center interface is provided, which in addition to accommodating the agent/client presence services described above, provides an interactive capability to clients for the purpose of enabling the client to perform a number of communication-center related tasks without involving agent interaction. In one embodiment, for example, the client is enabled to access information at the communication center, and to check thereby the status of a transaction. In this and other embodiments a client can access a variety of other information, and interact with communication center capabilities in a number of ways. The method and apparatus of the present invention is enabled in various embodiments by the teachings presented below.

Figure 8:
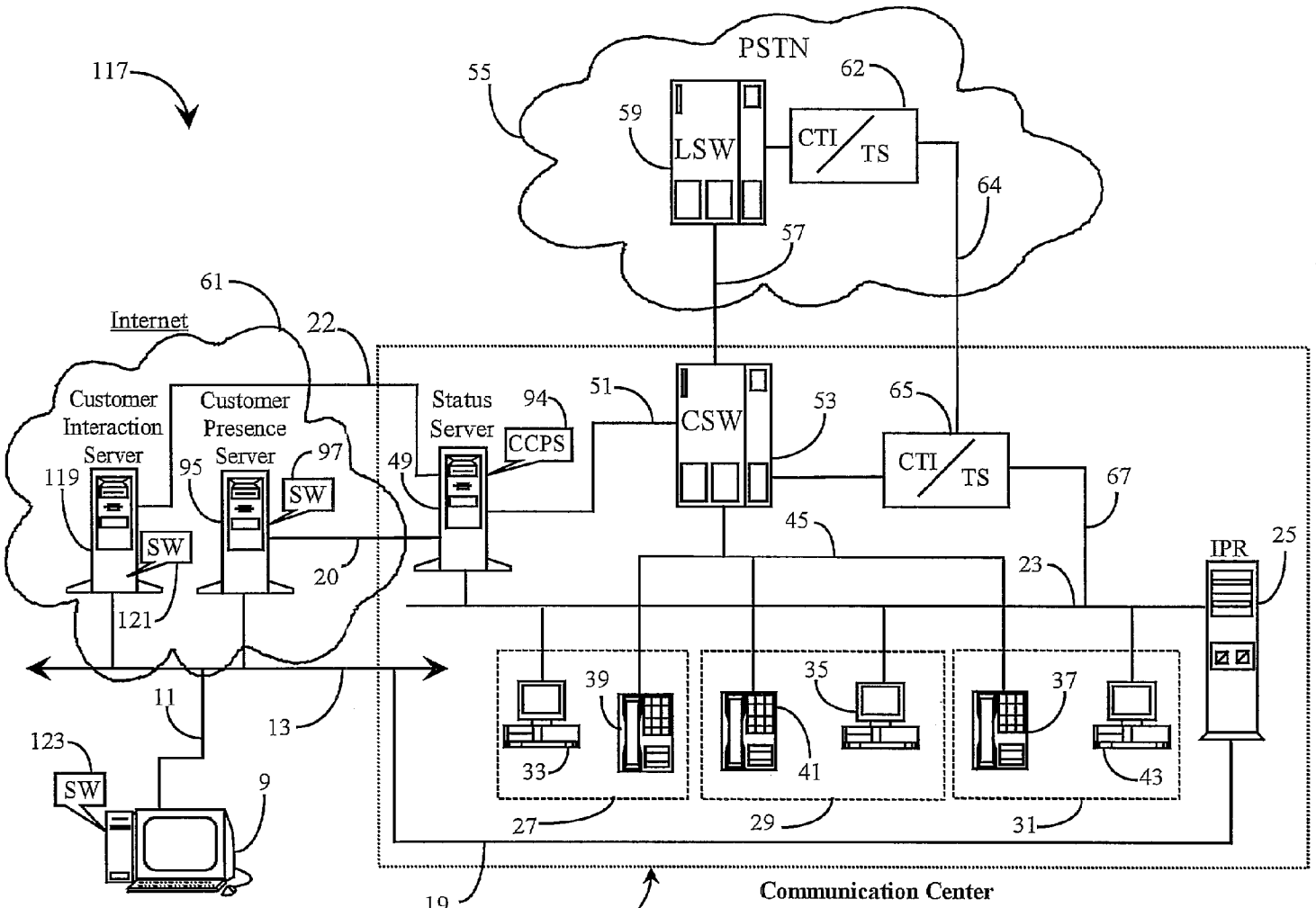
FIG. 8 is an overview of a communications network wherein a personal interaction-center system is utilized according to an embodiment of the present invention.

FIG. 8 is an overview of a communications network 177 wherein a personal interaction-center system is utilized according to an embodiment of the present invention. Communications network 117 is somewhat analogous to communications network 92 of FIG. 4 above in terms of basic architecture and software implementation. Elements of network 92 which are not modified for the purpose of enabling the present invention are not re-introduced with new element numbers. Communications network 117 comprises PSTN 55, DPN 61, communication center 21, and an exemplary user 9 as described above with reference to network 92 of FIG. 4.

PSTN 55, as described in the example of FIG. 4, represents a preferred network connecting all COST clients who call into communication center 21 for the purpose of doing business with the center. PSTN 55 is connected to the communication center 21 through COST telephony trunk 57 and data network 64.

In this example there are 2 exemplary file servers illustrated as connected to Internet backbone 13. These are a customer presence server (CPS) 95 and a customer interaction server (CIS) 119. It is noted herein that CPS 95 is identical with CPS 95 described in FIG. 4, and can be assumed to provide the formerly described functionality of server 95 and associated web presence server software 97 of the same example. CPS server 95 is, in this example, hosted by the same entity hosting communication center 21 and is utilized as an agent/customer interface.

CIS 119 is provided as a single example of a way in which the functionality of the present invention may be implemented. There are a number of other ways within the spirit and scope of the invention that this may be done, such as by utilizing the functions described above provided by WS 15 of FIG. 1 with those of FPS 93 of FIG. 4. The overall functionality may also be provided by utilizing the functions of WS 15 with those of CPS 95. Further, there is no implication here that the user interface, in the case of a Web page, by hosted by a third party. The descriptions of the functions of CIS 119 in great detail in the following material is to be construed in this light, that there needs be an interface, and that described is exemplary, and that the functions may be provided differently within the spirit and scope of the invention.

CPS SW 97 is enhanced for the purpose of allowing an agent to subscribe to real-time customer availability information as it applies to the remote station occupied by the customer. In this case, the station refers to remote PC 9, also referred to as user 9 in this specification. User 9 is connected to the Internet backbone 13 by access line 11, as was described with reference to FIG. 4. CPS 95 represents a collection server that is utilized for collecting and organizing client status information, which may be subscribed to or otherwise accessed by agents of communication center 21. CPS 95 is optional in this example and not specifically required in order to practice the present invention as will be described below.

It is noted in this example, that CPS server 95 is connected to status server 49 within communications center 21 by high-speed data connection 20. A second high-speed data connection 22 is provided for connecting CIS server 119 to status server 49. In this respect, status server 49 has identical high-speed access capability to both CPS 95 and CIS 119. It is similarly noted herein, that high-speed data-access lines connecting server 49 to servers 95 and 119 are not required in order to practice the present invention. Server 49 may instead be adapted to connect to Internet backbone 13 using such as a switched Internet connection.

In this embodiment, CPS 95, enhanced by CPS SW 97, is hosted by communication center 21 and adapted to function in much the same manner as CIS 119. That is to say that CPS 95 is a central facility for interaction. Agents 27, 29 and 31 may be assumed, in this example, to be accessing either CIS 119, or CPS 95 for the purpose of determining client status information and for making status information available to servicing agents.

IPR 25 handles incoming message events sourced from CIS 119 and/or CPS 95. Other than enhanced functionality represented by server 49 running CCPS 94 and dual connection capability from server 49 to CPS 95 and CIS 119, communication center 21 operates identically to the center (21) described in FIG. 4 including the configuration of agent's workstations and so on. Therefore, detailed re-description of the agent's operating environment (workstations, LAN connectivity, etc.) will not be provided in this example.

Agents 27, 29 and 31 may be assumed, in this example, to access either CIS 119, or CPS 95 for the purpose of determining client status information in a similar manner as that described in FIG. 4 above so that the information can be used for optimizing call-back scenarios. It is again noted that in the absence of CPS 95, it's function may be assumed to be provided to server 119.

IPR 25 handles incoming message events sourced from CIS 119 and/or CPS 95. Other than enhanced functionality represented by server 49 running CCPS 94 and dual connection capability from server 49 to CPS 95 and CIS 119, communication center 21 operates identically to the center (21) described in FIG. 4 including the configuration of agent's workstations and so on. Therefore, detailed re-description of agent's operating environment (workstations, LAN connectivity, etc.) will not be provided in this example.

A distributed software application is provided to reside in one part on server 119 as software (SW) 121 and in one part as software (123) residing at remote station 9. SW 121 is adapted to enable a user operating station 9 through SW 123 to subscribe to a personalized and interactive activity interface (SW 121). It is noted herein that while not required, SW 121 may incorporate the presence reporting capabilities taught in the examples of FIG. 4 (SW 97) and of the example of FIG. 1 (WPS 16). The inventor intends that the three capabilities taught, customer presence reporting, agent presence reporting, and personalized client interaction capabilities may be combined, if desired, into a single distributed software implementation namely SW 121 and SW 123. However, one with skill in the art will recognize that each capability taught may be separately implemented by both hardware and software provisions.

In one embodiment of the present invention, SW 123 residing on PC 9 is a known instant-messaging software adapted to enable client connection to CIS 119 as a centralized communication server. An example of one such known messaging service would be the well-known ICQ™ service. In this case, CCPS 94 running on status server 49 would be adapted to support the particular instant-messaging application employed by user 9 and supported at CIS 119 by SW 121. In this case server 119 may be hosted by the entity hosting general IM services and through special arrangement, may provide personalized interfaces enabling client interaction to common clients of center 21 and the entity hosting server 119.

In a preferred embodiment, SW 121 provides interactive activity interfaces of the form of dynamic WEB pages complete with instant messaging capabilities. In this embodiment, SW 123 at station 9 represents a thin client application that may operate in a stand-alone fashion or be plugged into a client's browser application.

In another embodiment, server 119 is hosted by the same entity that hosts center 21. In this regard, SW instances 121 and 123 are dedicated applications enabling client interaction capability with various communication-center resources.

CCPS 94 running on status server 94 is adapted to handle brokering of all of the targeted resource information from center 21 as well as all of the client presence data from a plurality of clients. For example, CCPS 94 is adapted to integrate and distribute to SW 121 an enhanced package of client-accessible and researchable data resources associated with communication-center activity as it pertains to a requesting client in a personalized manner. Such data, incorporated into a dynamic interface by virtue of SW 121 running on OS 119, is accessible to clients operating SW 123, in this case, running on user station 9. In addition to providing interactive access to communication-center resources, instant messaging may be employed such that agents 27, 29 and 31 may be able to communicate a variety of enhanced status messages to communicating clients being served by communication center 21. It is also noted herein, that the functionality of agent-status indication as taught above with reference to FIG. 1-3, may be integrated into software at CIS 119 and accessible from user station 9 without departing from the spirit and scope of the present invention. A communication-center agent, for example, an agent operating PC 43 within workstation 31 may subscribe to CIS 119 utilizing LAN 23, server 49, and high-speed data link 22 for the purpose of determining client presence, as well as for assisting a client with interactive tasks, if required.

In a preferred implementation of the present invention, a client (9) can verify a current interaction status between himself or herself and communication center 21 without initiating a call to the center. Center 21 can also verify the status of client 9 without initiating a callback. The further goal of this specification is to enable client 9 to perform a variety of center-related tasks, which may be performed without agent involvement. Such tasks may include, but are not limited to, checking current status of an order-in-progress, reviewing interaction history regarding events leading to an order-in-progress, modifying or canceling orders-in-progress, researching available product data, initiating contact with entities of center 21, subscribing to personalized notices of events including special sales and promotions, changing personal contact and status information, requesting a callback from the communication center specifying a specific medium and specifying a specific time, initiating a communication with the communication center and so on.

In one embodiment, client interaction at CIS 119 is open such that any subscribing agent in question may monitor states of activity of a plurality of users actively connected to CIS 119. According to a push model, user-status indications may be pushed in the form of periodic instant messages to, for example, PC 43, where they may be, for example, viewed by a monitoring agent working station 31. In this case, a monitoring agent may decide whether or not to become actively involved in interaction with a client. For example, if a client is reviewing interaction history regarding a particular product of interest handled by a monitoring agent, that agent may invite the client to a pre-scheduled chat session about the product, or perhaps an impromptu chat, which may lead to an additional sale. There are many possibilities when one considers full instant messaging and chat capability.

According to one embodiment, an agent operating PC 43 may subscribe to an interface (not shown) served by CIS 119 such that current status indications are contained within the interface and viewable on PC 43. In this embodiment, status server 49 executing CIS 119 provides interactive interfaces for both clients and agents for the purpose of viewing status and as a predecessor to impending dialogue. Also in this embodiment, status server 49 executing CCPS 94 may facilitate COST outbound dialing from agent to client through CSW 53 by virtue of connection 51.

An agent operating one of the connected workstations 27, 29 or 31 may subscribe real-time status reports associated with a plurality of users connected to CIS 119 as previously described. Subscription may be defined as an active or inactive state of dialog established between an agent and the connected users. The dialog states may be initiated and established by users contacting agents through the method of the present invention or by agents contacting users.

Although the present specification teaches a personalized interaction capability whereby clients may interact with various communication-center hosted resources, it will be clear to one with skill in the art that bi-directional status reporting as taught in the cross-referenced specifications, disclosure of which is encompassed by description of FIGS. 1-6, may also be provided through the same interface. An example of such an enhanced interface is presented below.

Figure 9:
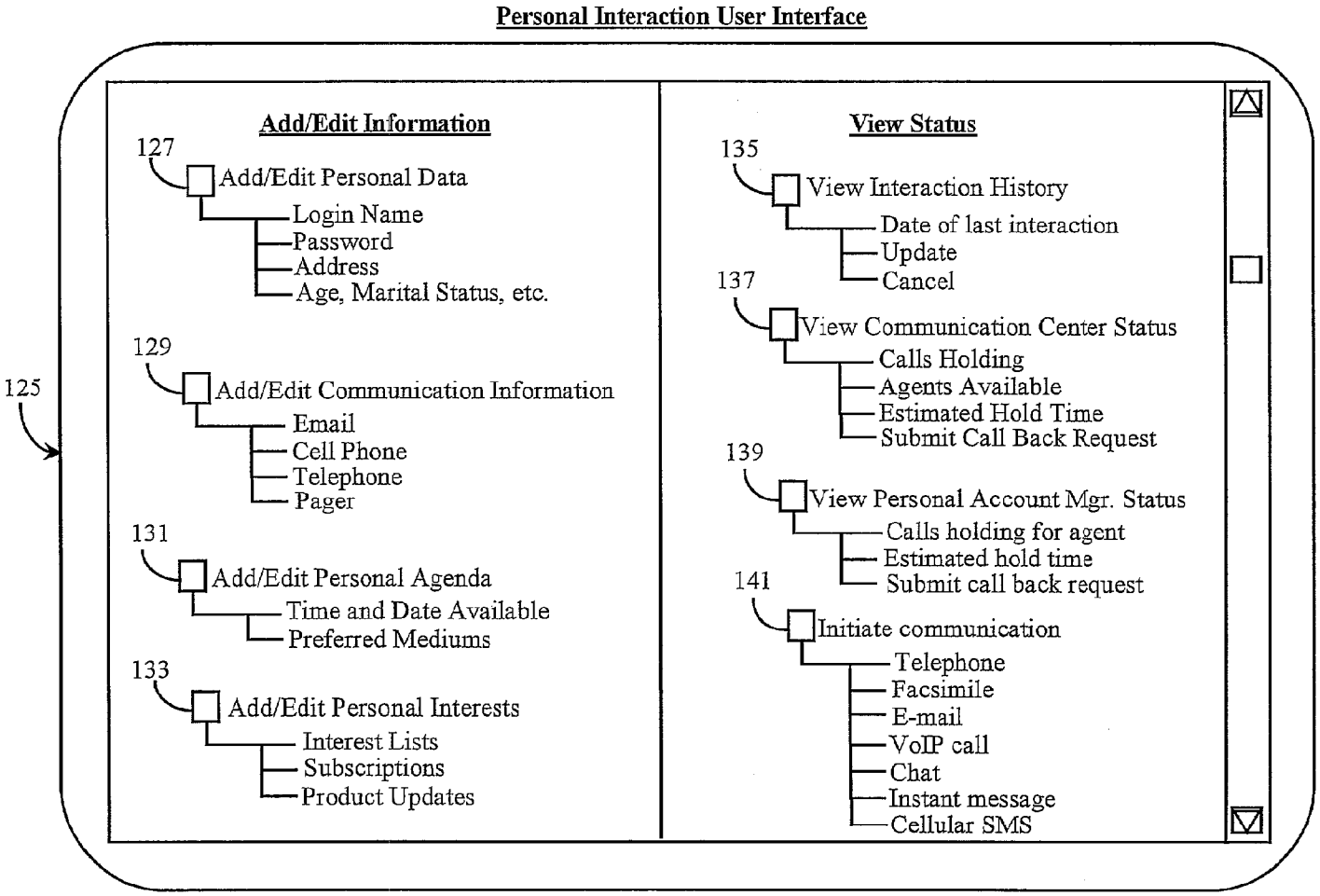
FIG. 9 is a plan view of an interactive user interface served by CIS 119 of FIG. 7 according to an embodiment of the present invention.

FIG. 9 is a plan view of an interactive user interface 125 served by CIS 119 of FIG. 8 according to an embodiment of the present invention. In this example, the Personal Interaction User Interface (PIUI) 125 is composed of two sub-elements or sections. These are a section labeled Add/Edit Information and a section labeled View Status. In this embodiment, the Add/Edit Information element is made up of four basic categories of data used to create a dynamic multifaceted profile of a client that is accessible to communication center entities. These four categories represent interactive add/edit functions illustrated in this example, by an element number 127 (critical account and personal data), an element number 129 (network-capable appliance communication information), an element number 131 (personal agenda information), and an element number 133 (personal interests data). The information described in sub-element 133 lends itself to life style and preferences of a client and therefore is established in a manner as to be updated as often as is necessary.

The section of interface 125 labeled View Status comprises two basic categories. These categories are illustrated herein by element number 135 (view interaction history) and element 137 (view communication center status). The information described in category 135 relates to current and past interaction history between a client operating interface 125 and entities of a communication center. Entities as defined herein may also be assumed to include automated systems. The information described in category 137 relates to status information made available by the center upon request and, in some cases, dependant on the nature of the request.

In addition to the above, element 139 is for viewing the status of individual agents as personal account managers, allowing a user to monitor calls holding for the agent, estimated hold time, and to submit a call-back request. Element 141 allows the user to initiate a communication in any one of a variety of formats, as indicated. As can be seen in this example, interface 125 covers all of the functionality described in the embodiments introduced by FIGS. 1 and 4 above.

In a preferred embodiment of the present invention, every client subscribing to the system of the present invention is provided with at least an identification parameter (member ID number). In this way, data obtained and stored from internal and external sources is easily identifiable to a particular client. In addition, passwords and log-in requirements may be instituted depending on enterprise rules. Much profile information about clients may be automatically compiled using on-going historical data resulting from ongoing relationships with clients. Such data, if available, may automatically appear in the describedAdd/Edit Information section of interface 125 when first created. It is important to note herein that the data categories 127, 129, 131, and 133 may be populated using automatic interaction recording methods during communication center interaction events.

Referring now to personal data category 127, this information is illustrated herein as divided into various basic subcategories. These subcategories are listed from top to bottom as: login name, password, address, and age, marital status, etc. Each category may be further divided into more subcategories as deemed appropriate. As data is automatically compiled about a client over time, the client's profile becomes more and more accurate. Interface 125 enables a client to manually add or edit information at any time.

Element 129 provides information relating to the network-capable appliance capabilities of the client. This element is divided into various subcategories befitting the status of the client. In this example. the subcategories are Email, cell phone, telephone, and pager. This element may be edited continuously in keeping with the changing requirements of the client. Additional communication capabilities may include but are not limited to IP phone, PC applications such as specific chat interfaces, file-share programs, and so on.

Element 131 reflects personal agenda information provided by a client and is divided into various subcategories that pertain to the client's personal preferences relative to time and date available for communicating with agents at the communication center and preferred method or methods of communication. Personal agenda information may be edited frequently as a client's personal state changes.

Element 133 pertains to personal interests of a client and is divided into multiple subcategories. In this example, the subcategories listed include interest lists, subscriptions, and product updates. Category 133 is, in this example, a vehicle through which a client may communicate general desires to agent's of a communication center. For example, interest lists may detail all of a client's particular interests whether related to communication-center business or not. By knowing interests of a client, agents may be better able to relate to the client on a personal level. Moreover, interests may be taken into consideration when serving the client. Subscriptions may include client subscriptions to communication-center provided material as well as to materials provided by other sources. Product updates may include requests to add notifications of when new or newly enhanced products offered by the communication center are available. Frequent client editing and addition of new data through category 133 is expected.

In the View Status section of interface 125, element 135 enables client access to personal interaction history as previously described. Subcategories of category 135 represented herein include a date of last interaction, an update option, and a cancel option. Information accessed through interaction within category 135 is compiled over time and is personalized to the client. Such available history data may include separate interaction records pertinent to separate communication mediums. Interaction records may be further divided by product, agent interacted with, and so on. Moreover, interaction with automated systems of a communication center may be included. In one embodiment, a client may be provided with various options for ordering interaction history records. For example, a client may order a combined record including all communication-center interaction presented according to data and time. In another embodiment, partial records may be ordered through a search function (not shown) provided in interface 125. There are many possibilities.

Element 137 pertains to communication center status reflecting information pertinent to a client when desiring contact with an entity of a communication center. It is noted here that a client may access and view agent status without initiating a contact event. However, in some embodiments, a client may submit an instant message summarizing an intent of a pending communication event whether it will be initiated by a client or by an agent calling the requesting client. Subcategories represented herein include calls holding, agents available, estimated hold time, and submit call back request. These and various other available options provide information for the client relative to the status of the communication center, and availability of services before connecting to the communication center or requesting a contact event from the center.

It will be apparent to one with skill in the art, that there may be more categories and subcategories described in interface 125 without departing from the spirit and scope of the present invention. The inventor has outlined basic categories and basic subcategories and deems them sufficient for illustrative purposes. Furthermore, as an interactive interface, it may be assumed that appropriate secondary interfaces will display for clients interacting with interface 125 such that selective viewing, data entry, editing, and so on may be accomplished. Such secondary interfaces may be linked to each category and subcategory through hyper linking or other known methods.

It will be apparent to one with skill in the art, that the method and apparatus of the present invention may be applied to a variety of connection scenarios without departing from the spirit and scope of the present invention. Similarly, the software of the present invention may be provided in a variety of functionalities ranging from an extendable application program interface (API) to an existing instant-messaging service to a fully functional server-driven service application including client-side and server-side components.

It will also be apparent to one with skill in the art, that instant messages, following standard instant message protocol, can be propagated back and forth between subscribing agents and clients without departing from the spirit and scope of the present invention. In addition to instant messaging, status alerts may take the form of pager messages or other types of known alerts when a client status is determined to be off-line. In addition, multiple protocols may be used, including IMPP, HTTP, WAP, and other known protocols, either alone or in combination.

Secure IMPP Routing

In one aspect of the present invention, the inventor provides a novel way of supporting third-party IMPP services in a secure manner by intelligently routing IM events within a closed, or in some cases open system of Customer Service Representatives (CSRs). Such a system is described in enabling detail below.

Figure 10:
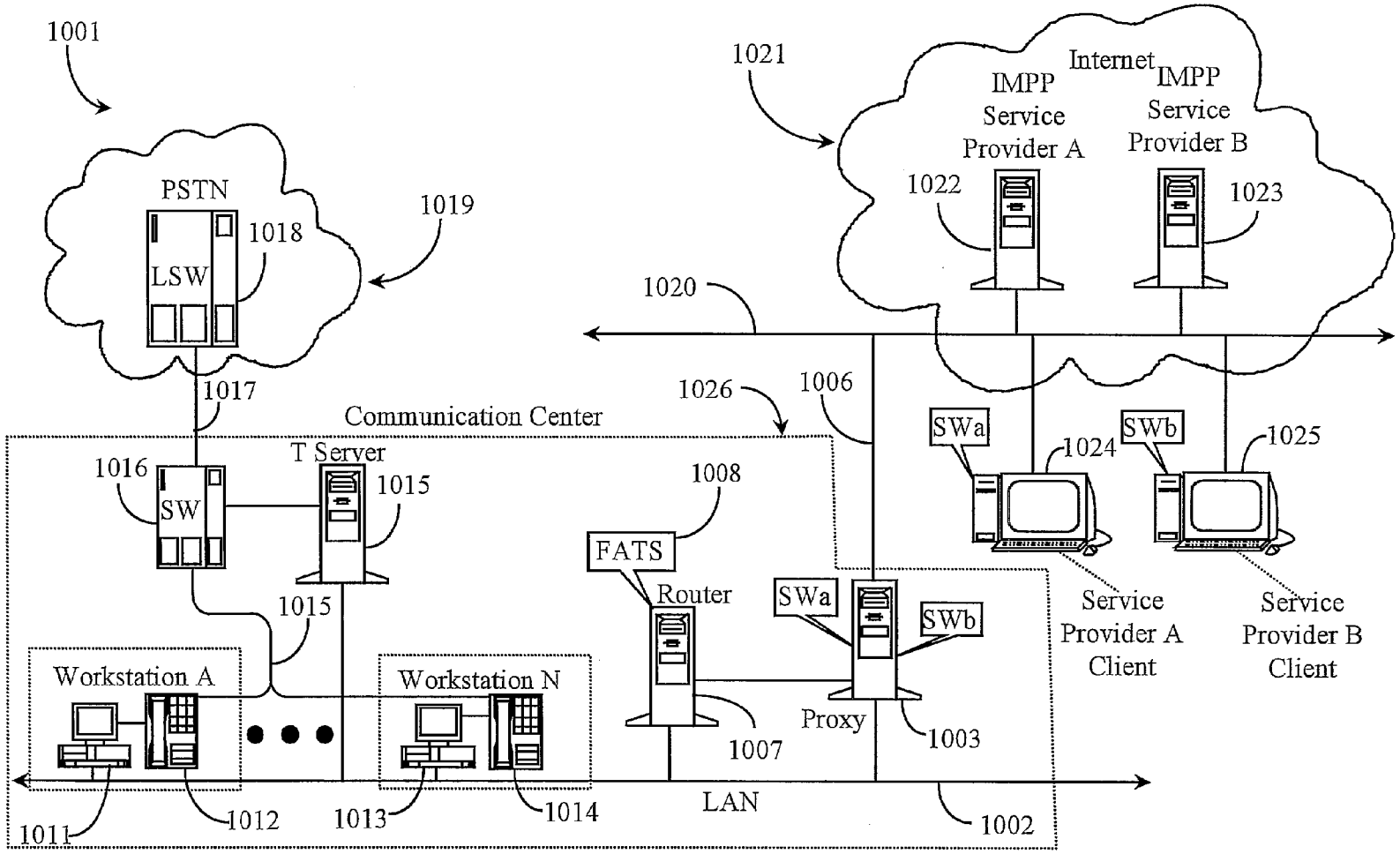
FIG. 10 is an overview of a communications network wherein IMPP event routing is practiced according to an embodiment of the present invention.

FIG. 10 is an overview of a communications network 1001 wherein IMPP event routing is practiced according to an embodiment of the present invention. Network 1001 consists of, in this example, a communication center 1026, an Internet network 1021, and a public-switch-telephone-network (PSTN) 1019. Network 1001 is analogous in preferred embodiments to networks 52 or 92 described above with respect to the FIGS. 1 and 4 pertaining to general function and preferences. For example, Internet 1021 and PSTN 1019 are preferred components because of a high public access characteristic and also because of network integration capabilities. It is not illustrated that network 1021 and network 1019 may pass data back and forth through an appropriate network gateway, but the capability may be assumed to be present.

Communication center 1026 is a dually-capable center able to handle call events both from network 1021 and from network 1019. Communication center 1026 has a local area network (LAN) 1002 operable therein and enabled in this example with IP protocols. In some cases, a central switch (SW) 1016 is provided within center 1026 and adapted to receive COST communication events. In other cases, other equivalents may be used such as a router, a softswitch or switchless telephony. In all those cases, some call routing capabilities exist, and are equivalent to a CTI server. A CTI server (T-Server) is provided and illustrated as connected to SW 1016 by a CTI-enabled link. T-Server 1015 provides at least intelligent routing routines for routing events within center 1026. In one embodiment, there may be similar T-Server-enhanced equipment provided within network 1019 and connected to a local switch (LSW) 1018 provided therein. As in previous network examples represented above by FIGS. 1 and 4, there may also be a separate digital network connecting server 1015 to a similar server in PSTN 1019 to provide a path for quick and parallel transfer of data for such as agent level routing at the PSTN level.

A plurality of workstations A-N are provided within center 1026 each having access to LAN 1002. Workstation A has a PC 1011 and a telephone 1012 implemented therein. Workstation N has a PC 1013 and a telephone 1014 implemented therein. It may be assumed that other workstations connected to LAN 1002 are similarly endowed with a PC and telephone, or other, equivalent network terminals. In this particular example, telephones 1012 and 1014 in stations A and N respectively are connected to their respective computers through cabling to the soundcard of each. This enables an agent to accept COST events either by picking up the phone, or by using the PC sound system. Telephones 1012 and 1014 are connected to SW 1016 by internal telephony wiring 1015.

A proxy server 1003 is provided within communication center 1026 and shares connection to LAN 1002 with workstations A-N. A data router 1007 running a firewall address translation application (FATS) 1008 is provided within center 1026 and also connected to LAN 1002 as a separate machine from server 1003. In actual practice, servers 1003 and router 1007 can be combined into one server/router machine having a LAN connection to LAN 1002. The inventor illustrates separate machines for purpose of clear description only.

Internet 1021 has instant message presence protocol (IMPP) service providers A and B servers illustrated therein and connected to an Internet backbone 1020. Backbone 1020 represents all of the lines, connection points and equipment that make up the Internet network as a geographic whole. Therefore, there are no geographic limitations to the practice of the present invention.

IMPP service provider A (server 1022) is adapted as a communication server of a provider such as the well-known AOL™ IM service. IMPP service provider B (server 1023) is adapted as a communication server hosted by a service other than AOL™ such as, perhaps MSN™. Moreover, there may be other IM servers present in this embodiment representing still other IM providers, of which there are many known without departing from the spirit and scope of the invention. The inventor provides 2 known examples and deems them sufficient for the purpose of describing the present invention in an enabling manner.

Clients of services represented by servers 1022 and 1023 within Internet 1021 are illustrated in this example as service provider A client (PC 1024), and service provider B client (PC 1025). In this example, client 1024 is an AOL™ user having IM software (SWa) and Internet connectivity to server 1022. Client 1025 is a MSN™ user having IM software (SWb) and Internet connectivity to server 1023. Internet connectivity for both clients 1024 and 1025 is represented by Internet access lines illustrated from each client to Internet backbone 1020. It will be apparent to one with skill in the art that clients 1024 and 1025 may access the Internet network (1021) through the PSTN network and ISP provision as is generally known in the art, but not explicitly shown in FIG. 10. There are also other known methods of Internet access any one of which may be used for either or both clients in this example as long as IM capability is supported over the access network.

An important goal of the present invention is to provide a controlled routing program that brokers communication between clients, namely 1024 and 1025 and agents (customer-service representatives—CSRs) of center 1026 operating at LAN-connected stations A and B. It is noted herein that agent presence information, client presence information, center status information and passive client interface capabilities as was described in disclosure covered by FIGS. 1-9 above may be assumed to be installed and operational within proxy server 1003. Server 1003 is adapted, in a preferred embodiment, as a central communication server and event router/switch through which all IM communication to and from agents in center 1026 passes. As previously described, router 1007 running application 1008 may also be considered to be integrated in some embodiments with proxy 1003.

In order to provide intelligent routing rules for routing IM events, T-server 1015 must be consulted by proxy 1003 for rules-related states such as agent availability, skill level, and so on. In this example, server 1003 consults server 1015 through LAN 1002. In another embodiment there may be a direct data link connecting the two servers. In still other embodiments the two servers may be implemented as one more powerful server.

Proxy server 1003 has SWa and SWb installed thereon, the software instances representing AOL™ and MSN™ IM packages. It is noted herein that there is no limit to the quantity of separate IM services that can be supported within center 1026. In cases where 2 separate protocols are compatible, one application may be installed within proxy 1003 that covers the functionality of both. In one embodiment server 1003 may have translation software in order to translate all kinds of supported IM protocols into one unified protocol supported by CSRs. In this case the client 1025 and the CSR may have different kinds of IM client software.

CSR stations A through N also have IM applications installed on respective PCs 1011-1013. CSR station A may support one or more separate instances of IM software for different providers as may all of the other stations. Any combination may be extant as long as the information is known to T-server software (1015). Agent-availability routines are utilized as a preferred routing criteria in this embodiment. Agent skill level routines, priority routing routines, and other routing routines may be similarly incorporated singularly or in combination.

In practice of the invention IMPP provider servers 1022 and 1023 are adapted to present a communication link to accessing clients (1024, 1025) whereby invocation of the link initiates an IM to center 1026, specifically to proxy server 1003. Proxy server 1003 of center 1026 is capable of generating IM messages in response to those received from servers 1022 and 1023 independently from the CSR system represented in this example by LAN-connected CSR representatives grouped for communication and routing purposes.

Proxy 1003 is also capable of routing IM notification events directly to representative PCs 1011 or 1013 over LAN 1002 upon consultation with and direction response from T-server 1015 executing the routing routines. In this example, router 1007 represents this function and FATS 1008 provides address translation capability to proxy 1003 for routing purposes.

Assume now that a CSR at station 1024 desires to contact center 1026 through server 1022, in this case, an AOL™ server. SWa is proprietary AOL™ IM software. By invoking an icon presented in the users interface, an IM requesting communication is generated and sent to server 1022 hosting the communication at this point. Server 1022 sends notification of the received event/request to proxy server 1003. It is important to note here that for security reasons, the only visible address to the user IM software is the IP address of proxy 1003. Proxy server 1003 having an appropriate instance of SWa installed therein responds by generating an IM to server 1022 to open dialogue. Proxy 1003 is capable of robotic IM communication simulating the function of an Interactive Voice Response (IVR) software. That is to say that before a request is eventually routed to a CSR representative, proxy server 1003 may execute one or more transactions with the user at server 1022 to find out how best to route the call.

When proxy 1003 has enough information to route a request, it notifies T-server 1015 of a pending request and associated parameters. Parameters may include a user's IP address, telephone number, version and brand of the IM application used by the user and other information subsequent to privacy policies of the acting IMPP provider. T-Server 1015 executes an agent-availability routine in this example to look for a CSR at any of stations A-N that has a running instance of AOL™ IM software or one compatible to the user's software and looks to see if the particular agent is available for an IM notification. T-server 1015 selects an available agent and sends notification of the selection back to proxy 1003.

Once selection is accomplished, proxy 1003 notifies the CSR with the user IM request and the CSR responds to server 1003 opening a connection that is now hosted by proxy 1003. A variety of options can be presented to users and made available through IMPP providers, such as the previously-described passive interaction interface, communication center status data, agent presence information and so on.

In one embodiment, IMPP providers simply provide a communication re-direct to proxy 1003 for any users invoking the option regardless of service/software brand. In this case proxy 1003 determines user identity, brand and version of IM capability, and immediately opens an IVR-type dialogue with the requesting user independently. IM transactions may at this time be hosted within server 1003 because of re-direct capability. In this case IMPP providers do not maintain communication channels on behalf of the users. Server 1003 must be adapted to function as an IMPP provider in this embodiment.

For security purposes, the only visible address outside of center 1026 is the IP address of proxy 1003. Proxy 1003 uses FATS software 1008 to translate to a selected CSR IP address on LAN 1002. In some cases, a CSR may have 2 or more IP addresses included in availability status provided that these are addresses of appliances that can practice IM messaging and have the IM application at least compatible with that of the requesting user.

In one embodiment, if a CSR cannot be found available then proxy 1003 returns an IM to the user stating this fact, and may also provide an estimated time waiting before a CSR will be available. In this embodiment, proxy 1003 may provide an IM form allowing a user to provided preferred call-back information. In one embodiment a passive interface may also be presented enabling the user to alter his or her personal center data such as order status, payment status, and so on. Similarly, proxy 1003 may be enhanced with the capability of re-directing the user to an automated system that the user may then interact with to automatically make a payment, place an order, etc.

The example presented herein represents a closed system wherein all of the CSRs operate on a limited LAN network. However this is not required in order to practice the present invention. In one embodiment the system may be extended to include more than one communication center and remote agents operating from isolated homes or offices but connected to the Internet for communication. All that is required for routing purposes is the software for monitoring CSR status locally and reporting software for remote CSRs over a defined network.

It will be apparent to one with skill in the art that varying third-party IMPP services will have variances in the way each application looks (interface) and, in some cases use options. Therefore, it is important to note herein that previously-described interfaces such as a passive interface template and other created templates or forms that may be passed in the form of IM messaging, such as customer presence status and communication center status including agent presence status, would be designed for use with each supported IMPP service at the communication center. In some cases, that may require a software plug-in (adapter) to be created and made available to clients if special purpose forms containing check boxes and the like are passed as IMs using stock third-party applications. In such full service environments, the inventor intends that these provisions be available and adaptable to the third party software instances.

On the other hand many, if not all, of the functional goals of the present invention can be met using the existing interface cosmetics currently used by most third-party applications, requiring no additional software modifications. For example, estimated waiting time can be communicated in a traditional IM. With enhanced parsing capabilities, a user may simply type any client presence information using the traditional third-party IM interface. Center information and agent presence information can be handled in much the same way.

A primary goal of the invention is to provide intelligent routing of traditional third-party hosted IM messages in such a way as to emulate an IVR/telephony routing convention wherein various routing rules and protocols may be applied. There are many possibilities.

Figure 11:
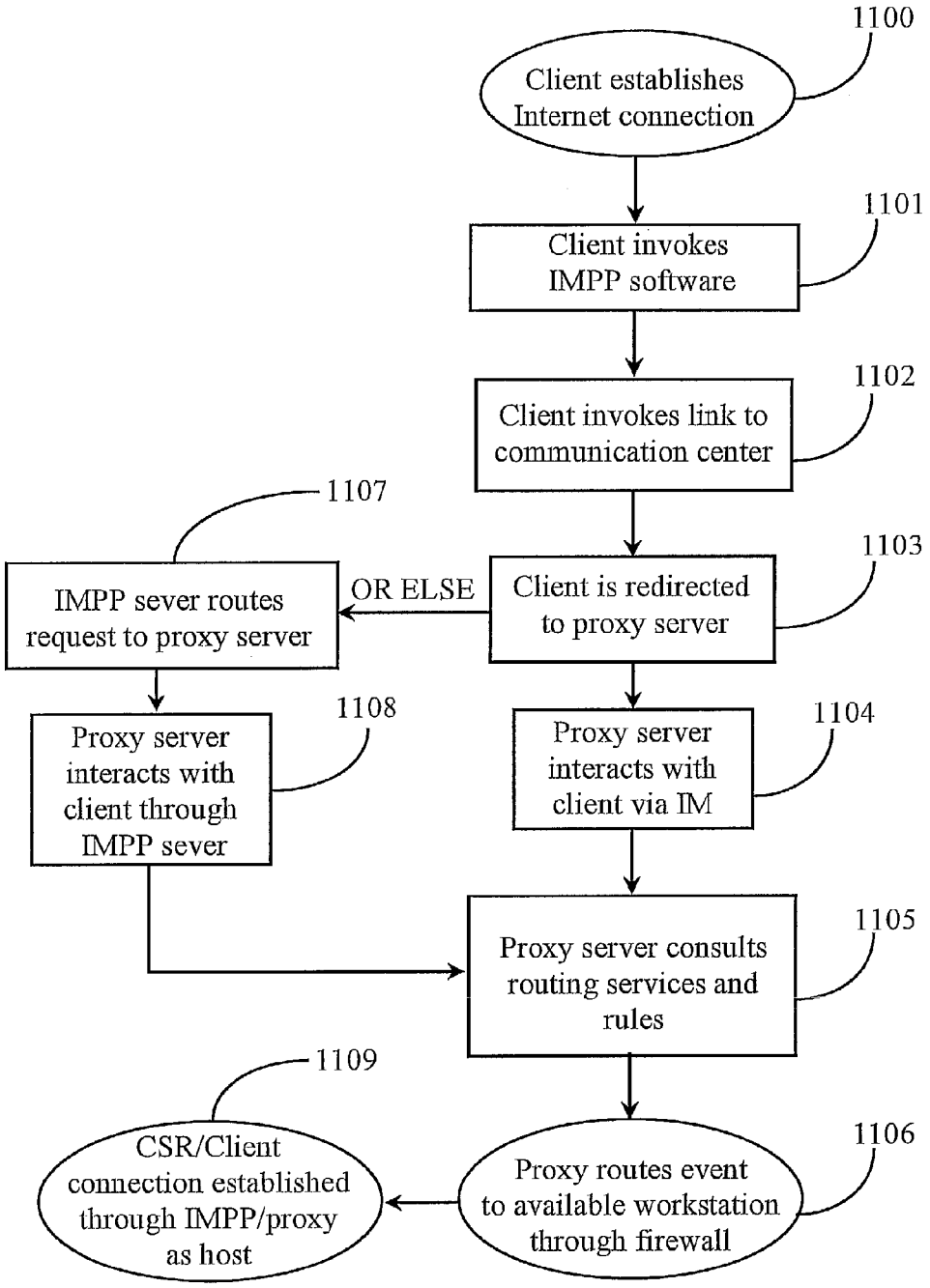
FIG. 11 is a flow diagram illustrating procedural steps for communicating using IMPP in conjunction with a communication center according to an embodiment of the present invention.

FIG. 11 is a flow chart illustrating client/service steps for practicing IM communication according to an embodiment of the present invention. At step 1100, a client analogous to one (1024, 1025) of FIG. 10 above establishes Internet connection through one of various known methods. Once connected, at step 1101 the client invokes his or her personal IMPP software. At this step, an automatic server connection is established between the client and a third-party IMPP message server analogous to server 1022 or 1023 of FIG. 10.

At step 1102, the client invokes a link to, in this example, a communication center analogous to center 1026 of FIG. 10. It is noted herein that a communication center is used in this example only for illustrative purpose as a convention having a group of CSRs connected for communication. In one embodiment, the CSR group could be remotely employed in an individual sense and share connection with a proxy server on the network, the server adapted to practice the present invention.

In step 1102, the link connecting to the center may be tiered such that invoking the link brings up a plurality of more granular links associated with specific groups of CSRs working in the center wherein such distinct groups may be unassociated with each other with regard to center functions.

For example, one CSR group within a center may handle sales whereas another may be dedicated to account management or quality service. There are many options.

At step 1103, the client is optionally re-directed to a proxy server analogous to server 1003 incorporating the function of server 1007 both of FIG. 10. If a client is re-directed, the IMPP message server is not hosting subsequent communication. In this case communication hosting is taken over by the proxy. In this event, the proxy must be endowed with all of the required software enabling the IMPP server.

In another aspect, at step 1107, the IMPP server, instead of performing a re-direct as described at step 1104, simply routes the client or user's IM request to the proxy server. In the case of re-direction at step 1103, at step 1104, the proxy server interacts directly with the client via IM messaging. In this step, the proxy emulates IVR technology in order to glean information from the client to aid in more appropriate routing. IM interaction between the proxy and client may follow a dedicated and directed sequence of options and answers, or may, with enhanced parsing capability, follow a more informal approach.

In the case of IMPP hosting communication as described with reference to step 1107, at step 1108, the proxy server interacts with the client through the IMPP host, the server functioning also as a client. In both cases, after obtaining enough client information for intelligent routing, at step 1105 the proxy consults routing services available and selects a routing state based on information collected from the client and any available conditions reported by the routing system. For example, the information collected from the client may include a desire to be connected with an accounting representative to discuss a late bill or payment. The routing system would check availability of a CSR in accounting having IM software running that is compatible with the client application and that is immediately available.

At step 1106 then, the proxy server routes the target IM event to the selected CSR workstation, preferably through a security firewall using an address translation protocol. At step 1109, communication is established between the selected CSR and the client either through the IMPP message server as a retentive host, or with the proxy server functioning as the communication host. It is important to note herein for security reasons, that it may be preferable to pass hosting responsibility to the proxy server within the center as this embodiment affords the added security of a firewall. The implementation will depend in part on the sensitivity level of the business enterprise and communication associated with it.

It will be apparent to one with skill in the art that the process steps described herein may be further broken down to include more granular sub-steps without departing from the spirit and scope of the present invention. For example, client identification steps, multiple routing consultation steps, optional steps for center contact from the IMPP server and so on may be herein assumed to be a part of the process without departing from the spirit and scope.

It will be further apparent to one with skill in the art that functionality of presence reporting for both client and agent as well as estimated time for CSR availability and general center status information may be made available through the traditional IM interface without a requirement for special templates designed for an IM environment. However, depending on levels of cooperation of IMPP service entities, special templates and interfaces including operational protocols may be developed and offered.

The method and apparatus of the present invention can be practiced over any data-packet-network wherein a group of connected entities, either CSRs, automated systems, or a combination of both maintain addresses accessible through the network and share a routing system. Therefore, the method and apparatus of the present invention should be afforded the broadest scope with regard to examination for allowance. The spirit and scope of the present invention is limited only by the language of the claims that follow.

What is claimed is:

1. An Instant Messaging (IM) communication system, comprising:

an IM server in a communication center, the IM server connected to a public data-packet-network and to a private data-packet-network, the private data-packet-network further connecting computerized workstations used by agents of the communication center;

*first data storage device storing* a set of routing rules for the communication center; and

[stored] *a second data storage device storing* agent data for the communication center, the data including agent availability and IM capability relative to one or more IM service protocols;

wherein the IM server receives IM messages from two or more external IM servers [using], *wherein the two or more external IM servers use* at least two different IM service protocols, via the public data-packet-network, the IM messages representing desired communication between specific clients of the external IM servers and agents of the communication center, consults the communication center routing rules, [IM service protocol capabilities] *the IM capability of the agents,* and the stored agent data to select available agents [with the needed] *based on the* IM service protocols *that is detected to be needed*, and establishes IM communication between the specific clients and the selected agents via the private data-packet-network, *for exchanging the IM messages between the specific clients and the agents, and*

*wherein the IM server in the communication center, in the event of receiving an IM notification from one of the specific clients, conducts IM communication with the one of the specific clients initiating the notification, elicits information from the one of the specific clients, identifies parameters relating to an IM application used by the one of the specific clients, and uses the elicited information along with the identified parameters relating to the IM application, the agent data, and availability, to determine a capable and available agent with whom to establish the IM communication for the one of the specific clients.*

*2. The system of claim 1 wherein the data-packet network is the Internet network.*

*3. The system of claim 1 wherein the IM server is in the data-packet-network and connects to the private data-packet-network via a computer-telephony-integration (CTI) processor at the communication center.*

*4. The system of claim 1, wherein the one of the specific clients initiating the notification is re-directed to the IM server, and the IM server is configured to host the IM communication between the one of the specific clients and the agent.*

*5. The system of claim 4, wherein the IM server is configured to interact with the one of the specific clients via IM.*

*6. The system or claim 5, wherein the IM server is configured to emulate interactive voice response technology for eliciting the information from the one of the specific clients.*

*7. The system of claim 1, wherein the elicited information includes version and brand of an IM application used by the one of the specific clients initiating the notification.*

*8. The system of claim 1, wherein a particular external IM server selected from the two or more external IM servers is configured to host the IM communication between the one of the specific clients and the agent.*

*9. The system of claim 8, wherein the IM server interacts with the one of the specific clients through the particular external IM server.*

*10. The system of claim 1, wherein the IM notification is initiated upon detecting selection of a link accessible to the one of the specific clients.*

* * * * *